United States Patent
Shin et al.

(10) Patent No.: US 9,690,437 B2
(45) Date of Patent: Jun. 27, 2017

(54) DISPLAY DEVICE HAVING IN-CELL TOUCH STRUCTURE AND METHOD OF DRIVING THE SAME

(71) Applicant: LG Display Co., Ltd., Seoul (KR)

(72) Inventors: SeungRok Shin, Goyang-si (KR); JiHyun Jung, Paju-si (KR); DeukSu Lee, Goyang-si (KR); Taeyun Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/836,762

(22) Filed: Aug. 26, 2015

(65) Prior Publication Data
US 2017/0060289 A1    Mar. 2, 2017

(51) Int. Cl.
G06F 3/044    (2006.01)
G09G 5/00    (2006.01)

(52) U.S. Cl.
CPC ............ *G06F 3/044* (2013.01); *G09G 5/003* (2013.01); *G09G 2300/0426* (2013.01)

(58) Field of Classification Search
CPC .............. G06F 3/044; G06F 2203/041; G06F 3/03547; G06F 3/041; G06F 3/0412; G06F 3/0414; G06F 3/0416; G06F 3/0418; G06F 3/046; G06F 3/047; G06F 2203/04107; G06F 2203/0411; H05K 9/0073; H05K 9/0079; H05K 9/0081; H05K 9/0088
USPC ................................................ 345/156–175
See application file for complete search history.

(56) References Cited

U.S. PATENT DOCUMENTS

| 9,423,907 | B2 * | 8/2016 | Lee ....................... G06F 3/0412 |
| 9,507,460 | B2 * | 11/2016 | Lee ....................... G06F 3/0416 |
| 2007/0285365 | A1 * | 12/2007 | Lee ....................... G06F 3/0412 345/87 |
| 2008/0062140 | A1 * | 3/2008 | Hotelling ............. G09G 3/3648 345/173 |
| 2008/0122798 | A1 * | 5/2008 | Koshiyama ........... G06F 3/0412 345/173 |

(Continued)

FOREIGN PATENT DOCUMENTS

| KR | 10-2013-0015584 A | 2/2013 |
| KR | 10-1315227 B1 | 10/2013 |

OTHER PUBLICATIONS

Korean Intellectual Property Office, Office Action, Korean Patent Application No. 10-2014-0024117, May 31, 2015, six pages [with concise explanation of relevance in English].

*Primary Examiner* — Grant Sitta
(74) *Attorney, Agent, or Firm* — Fenwick & West LLP

(57) ABSTRACT

A display driver circuit comprises first circuitry to generate a touch drive signal, and second circuitry to provide the touch drive signal to touch sense electrodes of the display device and a touch data signal to data lines of the display device during a touch period and to provide display data signals to data lines of the display device during a display period. A touch gate signal is provided to gate lines of the display device during the touch period. The touch drive signal, the touch data signal, and the touch gate signal mimic a reference waveform, but amplitudes of one or more of the touch drive signal, the touch data signal, and the touch gate signal are overdriven by their respective overdrive amplitude with respect to the reference waveform during their respective overdrive duration.

18 Claims, 43 Drawing Sheets

(56) References Cited

U.S. PATENT DOCUMENTS

| | | | |
|---|---|---|---|
| 2008/0309627 A1* | 12/2008 | Hotelling | G02F 1/134363 345/173 |
| 2009/0309851 A1* | 12/2009 | Bernstein | G06F 3/0416 345/174 |
| 2010/0253638 A1* | 10/2010 | Yousefpor | G06F 3/0412 345/173 |
| 2010/0302202 A1* | 12/2010 | Takeuchi | G06F 3/0412 345/174 |
| 2012/0154322 A1* | 6/2012 | Yang | G06F 3/0416 345/174 |
| 2012/0218482 A1* | 8/2012 | Hwang | G06F 3/044 349/12 |
| 2013/0009906 A1* | 1/2013 | Posamentier | G06F 3/044 345/174 |
| 2013/0050151 A1* | 2/2013 | Tu | G06F 3/0416 345/178 |
| 2013/0335376 A1* | 12/2013 | Lee | G06F 3/0416 345/174 |
| 2014/0049509 A1* | 2/2014 | Shepelev | G06F 3/044 345/174 |
| 2014/0139480 A1* | 5/2014 | Seo | G06F 3/044 345/174 |
| 2014/0184543 A1* | 7/2014 | Kim | G06F 3/0412 345/173 |
| 2014/0253498 A1* | 9/2014 | Suzuki | G06F 3/044 345/174 |
| 2014/0347321 A1* | 11/2014 | Roziere | G06F 3/044 345/174 |
| 2015/0116267 A1* | 4/2015 | Inoue | G06F 3/0416 345/174 |
| 2015/0170610 A1* | 6/2015 | Kurasawa | G09G 5/18 345/174 |
| 2015/0179132 A1* | 6/2015 | Lee | G09G 5/006 345/174 |
| 2015/0220208 A1* | 8/2015 | Noguchi | G06F 3/0412 345/174 |
| 2015/0323578 A1* | 11/2015 | Shahrokhi | G01R 27/2605 345/174 |

* cited by examiner

DISPLAY DEVICE HAVING IN-CELL TOUCH STRUCTURE AND METHOD OF DRIVING THE SAME

BACKGROUND OF THE INVENTION

Field of the Invention

The present invention relates to a display device having an in-cell touch structure and a method of driving the same.

Description of Related Art

In response to the development of the information society, there is increasing demand for various types of display devices able to display images. Currently, a range of display devices, such as liquid crystal display (LCD) devices, plasma display panels (PDPs) and organic light-emitting diode (OLED) display devices, are in common use.

Many display devices provide a touch-based input system enabling users to intuitively and conveniently input data or instructions directly to a device screen, rather than using conventional input systems, such as buttons, a keyboard, or a mouse.

In order to provide such a touch-based input system, sensitivity to the touch of a user and the ability to accurately detect coordinates of a touch point are required.

In this regard, the related art provides touch sensing systems using a touch sensing method selected from among a variety of touch sensing technologies, such as resistive touch sensing technology, capacitive touch sensing technology, electromagnetic induction technology, infrared (IR) touch sensing technology and ultrasonic touch sensing technology.

Among the variety of touch sensing technologies, capacitive touch sensing technology is most commonly used. This technology uses a plurality of touch electrodes (e.g. row electrodes and column electrodes) disposed on a touchscreen panel to detect a touch and coordinates of a touch point based on changes in capacitance between touch electrodes or between a pointer, such as a finger, and a touch electrode.

According to capacitive touch sensing technology, in addition to capacitance necessary for touch sensing, undesirable parasitic capacitance is generated by other voltage lines or electrodes surrounding touch electrodes.

Such undesirable parasitic capacitance causes certain problems, for example, increasing the load of a touch operation, decreasing the accuracy of touch sensing, and in severe cases, making touch sensing impossible.

The problems caused by parasitic capacitance become more severe in medium-sized or larger display devices.

The problems caused by the undesirable parasitic capacitance frequently occur in in-cell display devices inside which a touchscreen panel (TSP) is integrally provided using "in-cell" technology, even causing the realization of medium-sized or larger in-cell touchscreen panels to be impossible.

BRIEF SUMMARY

Various aspects of the present invention provide a display device having an in-cell touch structure and a method of driving the same able to prevent parasitic capacitance that would otherwise increase the load of a touch operation, lower the accuracy of touch sensing, or disable touch sensing.

Also provided is a medium-sized or larger display device having an in-cell touch structure that could have not been previously realized due to parasitic capacitance.

Also provided is a medium-sized or larger display device having an in-cell touch structure able to prevent parasitic capacitance regardless of variations in a resistor capacitor (RC) load due to different panel positions.

Also provided is a display device having an in-cell touch structure able to increase the efficiency of touch sensing by forming a voltage having an intended level on a touch electrode, a data line, or a gate line within a predetermined period of time when applying a touch driving signal, a touch data signal, or a touch gate signal to the touch electrode, the data line, or the gate line in consideration of variations in the RC load.

According to an aspect of the present invention, a display device having an in-cell touch structure includes: a panel comprising a plurality of data lines disposed in a first direction, a plurality of gate lines disposed in a second direction, a plurality of electrodes grouped into a plurality of electrode groups; a source driver supplying a data voltage to the plurality of data lines in a display driving mode; a scanning driver sequentially supplying a scanning signal to the plurality of gate lines in the display driving mode; and a touch circuit outputting a touch driving signal in a touch driving mode, the touch driving signal being applied to all or portions of the plurality of electrodes. In the touch driving mode, a touch data signal is further applied to all or portions of the plurality of data lines, a touch gate signal is further applied to all or portions of the plurality of gate lines, or the touch data signal is further applied to all or portions of the plurality of data lines and the touch gate signal is further applied to all or portions of the plurality of gate lines.

According to another aspect of the present invention, a display device having an in-cell touch structure includes: a plurality of electrodes spaced apart from each other, wherein a common voltage is applied to the plurality of electrodes in a display driving mode, and a touch driving signal is applied to all or portions of the plurality of electrodes in a touch driving mode; a plurality of data lines disposed in a first direction, wherein a data voltage is supplied to the plurality of data lines in the display driving mode; and a plurality of gate lines disposed in a second direction, wherein a scanning signal is sequentially supplied to the plurality of gate lines. The signal strength of the waveform of the touch driving signal is greater than a reference voltage by a predetermined voltage.

According to further another aspect of the present invention, a display device having an in-cell touch structure includes: a plurality of data lines to which a data voltage is supplied in a display driving mode; a plurality of gate lines to which a scanning signal is sequentially supplied in the display driving mode; and a plurality of electrodes spaced apart from each other, wherein a common voltage is applied to the plurality of electrodes in the display driving mode, and a touch driving signal is applied to all or portions of the plurality of electrodes in the touch driving mode, a signal voltage level of the touch driving signal alternating between a higher level and a lower level. The waveform of the touch driving signal has two different higher voltage levels and two different lower voltage levels.

According to still another aspect of the present invention, provided is a method of driving a display device having an in-cell touch structure. The display device includes a panel and a touch circuit, wherein a plurality of data lines, a plurality of gate lines, and a plurality of common electrodes are disposed on the panel, the plurality of data lines and the plurality of gate lines defining a plurality of pixels. The method includes: in the timing of display driving, applying a common voltage to the plurality of common electrodes;

and in the timing of touch driving, applying a touch driving signal to at least one common electrode among the plurality of common electrodes, and further applying a touch data signal to at least one data line among the plurality of data lines or further applying a touch gate signal to at least one gate line among the plurality of gate lines.

According to another aspect of the present invention, a display device having an in-cell touch structure includes: a panel comprising a plurality of data lines disposed in a first direction, a plurality of gate lines disposed in a second direction, and a plurality of multi-use electrodes; a source driver supplying a data voltage to the plurality of data lines in a display driving mode; and a scanning driver sequentially supplying a scanning signal to the plurality of gate lines in the display driving mode. The source driver or the scanning driver applies a touch driving signal to all or portions of the plurality of multi-use electrodes in a touch driving mode. The waveform of the touch driving signal has two different higher voltage levels and two different lower voltage levels.

The source driver may apply a touch data signal to all or portions of the plurality of data lines in the touch driving mode, the touch data signal corresponding to the waveform of the touch driving signal.

The scanning driver may apply a touch gate signal to all or portions of the plurality of gate lines, the touch gate signal corresponding to the waveform of the touch driving signal.

The common voltage required for display driving may be applied to the plurality of multi-use electrodes in the display driving mode.

According to yet another aspect of the present invention, a display device having an in-cell touch structure includes: a panel comprising a plurality of data lines disposed in a first direction, a plurality of gate lines disposed in a second direction, and a plurality of touch electrodes; a source driver supplying a data voltage to the plurality of data lines in a display driving mode; and a scanning driver sequentially supplying a scanning signal to the plurality of gate lines in the display driving mode. A touch driving signal having an overdriven signal waveform is applied to all or portions of the plurality of electrodes in a touch driving mode.

In the touch driving mode, a touch data signal may be applied to all or portions of the plurality of data lines. The touch data signal has an overdriven signal waveform corresponding to a signal waveform of the touch driving signal.

In the touch driving mode, a touch gate signal may be applied to all or portions of the plurality of gate lines. The touch gate signal has an overdriven signal waveform corresponding to a signal waveform of the touch driving signal.

In still another embodiment, a display driver circuit for driving a display device comprises first circuitry to generate a touch drive signal, and second circuitry to provide the touch drive signal to touch sense electrodes of the display device and a touch data signal to data lines of the display device during a touch period and to provide display data signals to data lines of the display device during a display period. Also, a touch gate signal is provided to gate lines of the display device during the touch period. The touch drive signal, the touch data signal, and the touch gate signal mimic a reference waveform, but amplitudes of one or more of the touch drive signal, the touch data signal, and the touch gate signal are overdriven by their respective overdrive amplitude with respect to the reference waveform during their respective overdrive duration.

In some embodiments, one or more of the overdrive amplitudes or the overdrive durations of the touch data signal or the touch gate signal is different from the overdrive amplitude or overdrive duration of the touch drive signal.

Still in some embodiments, the reference waveform is a pulse waveform periodically alternating between a high level and a low level, and one or more of the touch driving signal, the touch data signal, and the touch gate signal have two or more different high voltage levels during the high level and two or more different low voltage levels during the low level.

The overdrive amplitude or the overdrive duration may be greater as the distance from the second circuitry to the touch sense electrodes, the data lines, or the gate lines is farther. The overdrive durations begin when the touch drive signal, the touch data signal, or the touch gate signal transitions from low level to high level, or vice versa. The display driver circuit of claim 1, wherein the touch drive signal, the touch data signal, and the touch gate signal are driven in phase with one another.

In some embodiments, the amplitudes of two or more of the touch drive signal, the touch data signal, and the touch gate signal are same at transition from low level to high level, or vice versa, said transition occurring subsequent to end of the overdrive duration, regardless of position in the data lines or the gate lines or of the touch sense electrodes.

In still another embodiment, a display device comprises a panel including a plurality of data lines, a plurality of gate lines, and a plurality of electrodes grouped into a plurality of electrode groups, pixels of the display device being defined at intersections of the gate lines and the data lines, a touch driver to provide a touch drive signal to the electrodes of the display device during a touch period, a data driver to provide display data signals to data lines of the display device during a display period and a touch data signal to data lines of the display device during the touch period, and a gate driver sequentially supplying a scanning signal to the gate lines during the display period and to provide a touch gate signal to the gate lines during the touch period. The touch drive signal, the touch data signal, and the touch gate signal mimic a reference waveform, but amplitudes of one or more of the touch drive signal, the touch data signal, and the touch gate signal are overdriven by their respective overdrive amplitude with respect to the reference waveform during their respective overdrive duration.

According to the present invention as set forth above, it is possible to provide a display device having an in-cell touch structure and a method of driving the same able to prevent parasitic capacitance that would otherwise increase the load of a touch operation, lower the accuracy of touch sensing, or disable touch sensing.

In addition, according to the present invention, it is possible to provide a medium-sized or larger display device having an in-cell touch structure that could have not been previously realized due to parasitic capacitance.

Furthermore, according to the present invention, it is possible to provide a display device having an in-cell touch structure able to prevent parasitic capacitance regardless of variations in the RC load due to different panel positions.

In addition, according to the present invention, it is possible to provide a display device having an in-cell touch structure able to increase the efficiency of touch sensing by forming a voltage having an intended level on a touch electrode, a data line, or a gate line within a predetermined period of time when applying a touch driving signal, a touch data signal, or a touch gate signal to the touch electrode, the data line, or the gate line in consideration of variations in the RC load.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
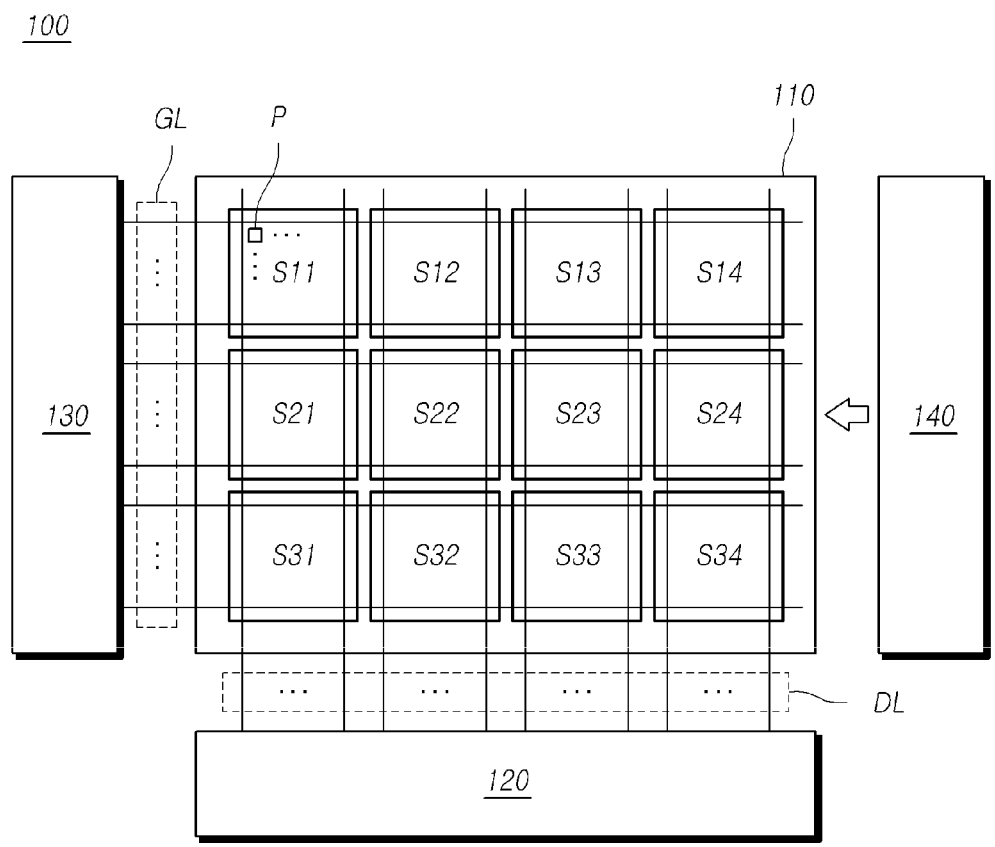
FIG. 1 is a schematic configuration view illustrating an exemplary display device having an in-cell touch structure according to an embodiment of the present invention.

Reference will now be made in detail to embodiments of the present invention, examples of which are illustrated in the accompanying drawings. Throughout this document, reference should be made to the drawings, in which the same reference numerals and signs will be used to designate the same or like components. In the following description of the present invention, detailed descriptions of known functions and components incorporated herein will be omitted in the case that the subject matter of the present invention may be rendered unclear thereby.

It will also be understood that, although terms such as "first," "second," "A," "B," "(a)" and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected" or "coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a schematic configuration view illustrating an exemplary display device 100 having an in-cell touch structure according to an embodiment of the present invention.

Referring to FIG. 1, the display device 100 having an in-cell touch structure according to the embodiment includes a panel 110, a source driver 120, a scanning driver 130, and a touch circuit 140. In some embodiments, the source driver 120 and the touch circuit 140 may be collectively referred to as "display driver circuit," since they may sometimes be integrated into a single integrated circuit (IC) to drive the display device 100.

On the panel 110, a plurality of data lines LD are disposed in a first direction (e.g. in columns or in rows), a plurality of gate lines GL are disposed in a second direction (e.g. in rows or in columns), and a plurality of pixels P are respectively defined, corresponding to a plurality of points at which the plurality of data lines LD intersect the plurality of gate lines GL.

A transistor is formed in each pixel area of the plurality of pixels P. In the transistor, a source or drain electrode is connected to a corresponding data line among the plurality of data lines DL, a gate electrode is connected to a corresponding gate line of the plurality of gate lines GL, and the drain or source electrode is connected to a pixel electrode.

A plurality of electrodes S11 to S14, S21 to S24, and S31 to S34 are also disposed on the panel 110 to be spaced apart from each other. The plurality of electrodes are grouped into a plurality of electrode groups.

The panel 110 functions not only as a display panel but also as a touchscreen panel (TSP).

The panel 110 may be a panel in which a display panel and a touchscreen panel are integrated or may be a display panel in which an in-cell touchscreen panel is embedded.

When the panel 110 functions as a display panel, the driving mode thereof is referred to as a display driving mode. When the panel 110 functions as a touchscreen panel, the driving mode thereof is referred to as a touch driving mode.

When the panel 110 is driven in the display driving mode, the source driver 120 supplies a data voltage Vdata for a display application to the plurality of data lines LD.

When the panel 110 operates in the display driving mode, the scanning driver 130 sequentially supplies a scanning signal for a display application to the plurality of gate lines GL.

When the panel 110 is driven in the touch driving mode, the touch circuit 140 outputs touch driving signal Vtouch_vcom to be applied to all or portions of the plurality of electrodes S11 to S14, S21 to S24, and S31 to S34 which are directly connected thereto via signal lines. The touch driving signal are also referred to as a touch sensing signal, a touch sensing voltage or a touch driving voltage.

For example, when the panel 110 is driven in the touch driving mode, the touch circuit 140 applies the touch driving signal Vtouch_vcom to all or portions of the plurality of electrode groups of the plurality of electrodes S11 to S14, S21 to S24 and S31 to S34.

The display device 100 having an in-cell touch structure according to the embodiment further includes a timing controller (not shown) controlling the driving timing of the source driver 120 and the scanning driver 130.

In addition, the display device 100 having an in-cell touch structure according to the embodiment further includes a touch controller (not shown) detecting a touch, the coordinates of the touch, and the like by receiving sensing data (e.g. capacitance, a change in capacitance, or a voltage) measured by the touch circuit 140 via the plurality of electrodes S11 to S14, S21 to S24, and S31 to S34 that function as touch electrodes.

The panel 110 of the display device 100 having an in-cell touch structure according to the embodiment operates alternately in the display driving mode and the touch driving mode. The timing of the display driving mode and the timing of the touch driving mode can be controlled in response to control signals output from the timing controller, the touch controller or the like, or in some cases, can be controlled through cooperation between the timing controller and the touch controller.

The display device 100 having an in-cell touch structure according to the embodiment employs a capacitive touch sensing technology of detecting a touch and the coordinates of the touch based on a change in capacitance using a plurality of touch electrodes (also referred to as touch sensors) disposed on the touchscreen panel.

This capacitive touch sensing technology can be categorized as, for example, mutual capacitive touch sensing and self-capacitive touch sensing.

Mutual capacitive touch sensing, an example of the capacitive touch sensing technology, enables touch electrodes disposed in one direction, among the plurality of touch electrodes, to function as transmitting (Tx) electrodes (also referred to as driving electrodes) to which a driving voltage is applied and touch electrodes disposed in the other direction, among the plurality of touch electrodes, to function as receiving (Rx) electrodes (also referred to as sensing electrodes) sensing the driving voltage. A touch and the coordinates of the touch are detected based on a change in capacitance (mutual capacitance) between a Tx electrode and an Rx electrode depending on the presence of a pointer, such as a finger or a pen.

On the other hand, self-capacitive touch sensing, another example of the capacitive touch sensing technology, includes: generating capacitance (self-capacitance) between each of the touch electrodes and a pointer, such as a finger or a pen; measuring a capacitance value between each of the touch electrodes and the pointer, such as a finger or a pen, depending on the presence of the pointer; and sensing a touch and the coordinates of the touch based on the detected capacitance value. Unlike the mutual capacitive touch sensing, the self-capacitive touch sensing concurrently applies and senses a driving voltage (touch driving signal Vtouch_vcom) through the touch electrodes. Therefore, such self-capacitive touch sensing does not distinguish between the Tx electrodes and the Rx electrodes.

The display device 100 having an in-cell touch structure according to the embodiment can employ one of the two above-mentioned types of capacitive touch sensing, i.e. the mutual capacitive touch sensing and the self-capacitive touch sensing. In this disclosure, however, for the sake of explanation, a case in which the self-capacitive touch sensing is employed will be described.

The source driver 120 includes one or more data driver integrated circuits (ICs) (also referred to as source driver ICs). The data driver ICs may be connected to the bonding pads of the panel 110 by tape-automated bonding (TAB) or chip-on-glass (COG) bonding, may be directly disposed on the panel 110, or in some cases, may be integrated with the display panel 110, forming a portion of the display panel 110.

The above-mentioned scanning driver 130 is positioned on one side of the panel 110, as illustrated in FIG. 1. Depending on the driving method, the gate driver unit 130 may be divided into two sections positioned on both sides of the panel 110.

The scanning driver 130 includes one or more gate driver integrated circuits (ICs). The gate driver ICs may be connected to the bonding pads of the display panel 110 by tape-automated bonding (TAB) or chip-on-glass (COG) bonding, may be implemented as a gate-in-panel (GIP)-type IC directly disposed on the display panel 110, or in some cases, may be integrated with the display panel 110, forming a portion of the display panel 110.

As illustrated in FIG. 1, the above-mentioned touch circuit 140 is disposed outside the source driver 120 and the scanning driver 130, as a component separate therefrom. Alternatively, the touch circuit 140 may be implemented as an internal component of another separate driver IC (e.g. a display driver IC) including at least one of the source driver 120 and the scanning driver 130 or may be implemented as an internal component of the source driver 120 or the scanning driver 130. In addition, a signal-generating module of the touch circuit 140 generating touch driving signal may be disposed outside the source driver 120 and the scanning driver 130, and a signal-applying module of the touch circuit 140 applying touch driving signal output from the signal-generating module to all or portions of the plurality of electrodes may be disposed within the source driver 120 or the scanning driver 130.

Therefore, in the touch driving mode, the application of touch driving signal Vtouch_vcom by the touch circuit 140 to all or portions of the plurality of electrodes functioning as the touch electrodes in the touch driving mode may be implemented by the separate driver IC including the touch circuit 140 applying the touch driving signal Vtouch_vcom to all or portions of the plurality of electrodes functioning as the touch electrodes. Depending on the design, the source driver 120 or the scanning driver 130 including the touch circuit 140 may apply the touch driving signal Vtouch_vcom to all or portions of the plurality of electrodes functioning as the touch electrodes.

The touch circuit 140 is not limited to the above-described implementation or design. It should be understood that the touch circuit 140 may be implemented as any configuration or an internal or external component thereof, the functions of which are equivalent or similar to those described herein.

Although the touch circuit 140 is illustrated as being a single circuit in FIG. 1, the touch circuit 140 may be implemented as two or more circuits or sections.

The touch circuit 140 needs a separate signal line configuration connected to each of the plurality of electrodes, for example, S11 to S14, S21 to S24, and S31 to S34 in order to apply the touch driving signal Vtouch_vcom to all or portions of the plurality of electrodes S11 to S14, S21 to S24, and S31 to S34.

A plurality of signal lines may be disposed on the panel 110 in a first direction (e.g. in columns) or a second direction (e.g. in rows). Each of the plurality of signal lines is connected to a corresponding electrode of the plurality of electrodes S11 to S14, S21 to S24, and S31 to S34 to transfer the touch driving signal or a common voltage thereto, depending on the driving mode.

The plurality of signal lines connected to the plurality of electrodes S11 to S14, S21 to S24, and S31 to S34 may be disposed, for example, on an area of a second substrate (e.g. a lower substrate or thin-film transistor (TFT) array substrate) of the panel 110 that faces an area of a black matrix formed on a first substrate (e.g. an upper substrate or a color filter substrate) of the panel 110 in order to prevent a reduction in an aperture ratio.

When the signal line configuration connected to each of the plurality of electrodes S11 to S14, S21 to S24, and S31 to S34 is implemented as two or more signal lines, resistance can be reduced.

Figure 3:
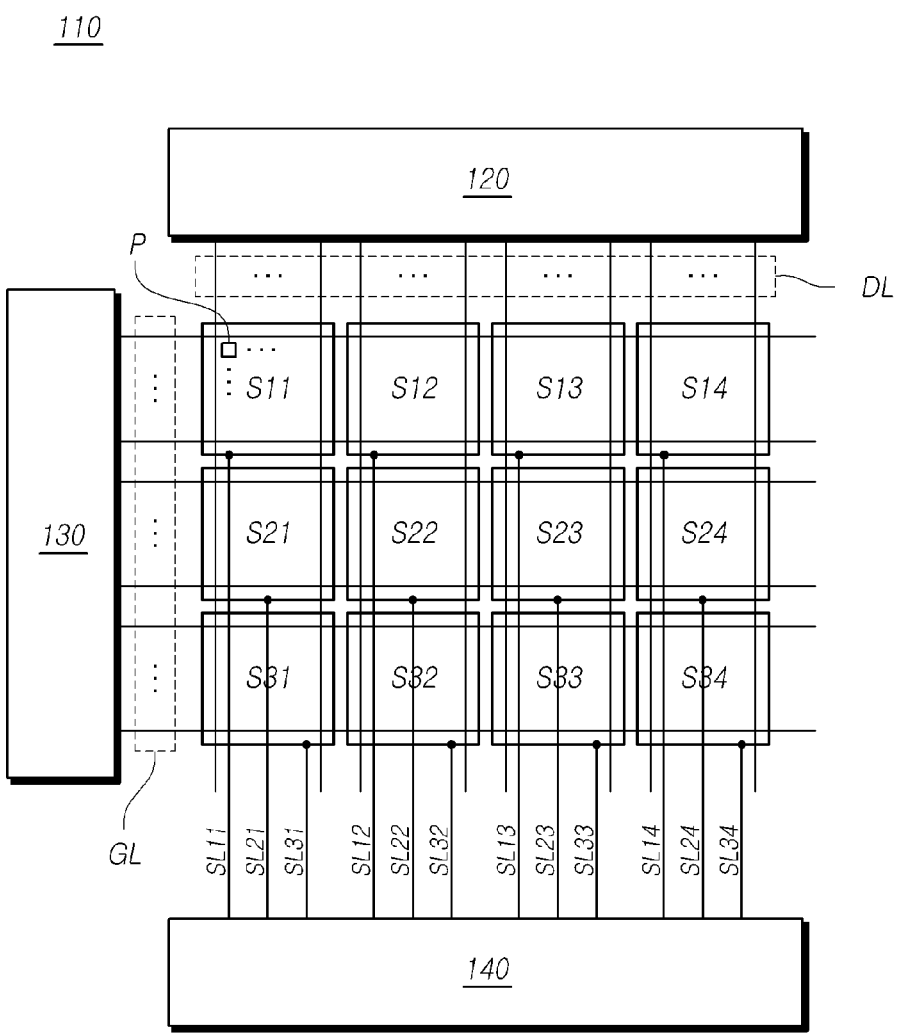
FIG. 3 is a schematic configuration view illustrating an exemplary panel of the display device having an in-cell touch structure according to the embodiment.

The directions of the plurality of signal lines connected to the plurality of electrodes S11 to S14, S21 to S24, and S31 to S34 may differ depending on whether sensing is performed by grouping the plurality of electrodes S11 to S14, S21 to S24, and S31 to S34 in the first direction (e.g. in a column direction) in which the data lines DL extend or in the second direction (e.g. in a row direction) in which the gate lines GL extend (see FIG. 3).

When sensing is performed by grouping the plurality of electrodes S11 to S14, S21 to S24, and S31 to S34 in the first direction (e.g. in the column direction) in which the data lines extend, the plurality of signal line connected to the plurality of electrodes S11 to S14, S21 to S24, and S31 to S34 may be disposed in the first direction (e.g. in the column direction) in which the data lines extend (see FIG. 3).

Figure 5:
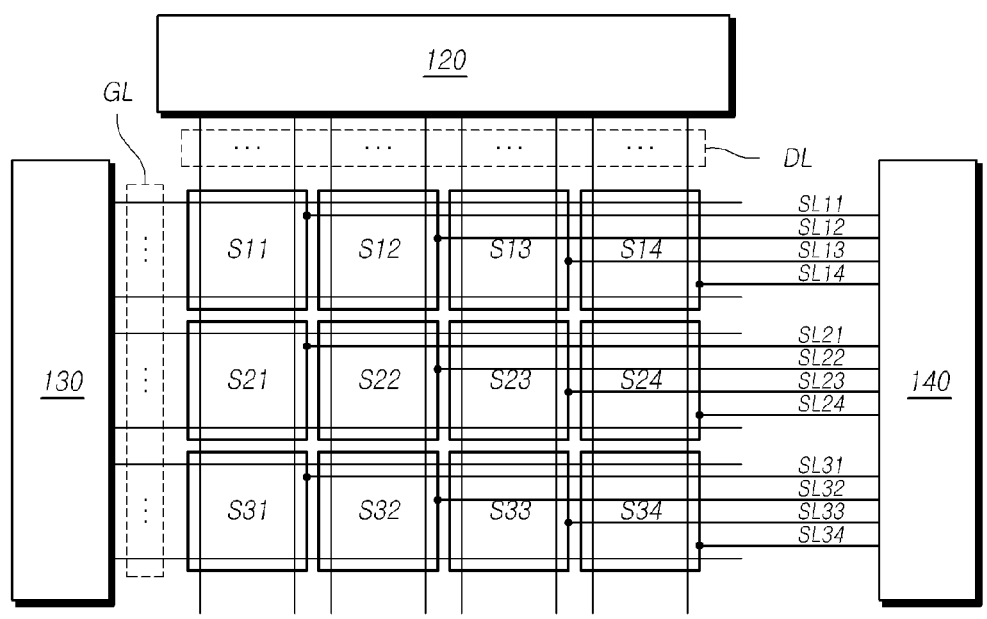
FIG. 5 is a schematic configuration view illustrating another exemplary panel of the display device having an in-cell touch structure according to the embodiment.

When sensing is performed by grouping the plurality of electrodes S11 to S14, S21 to S24, and S31 to S34 in the second direction (e.g. in the row direction) in which the gate lines extend, the plurality of signal lines connected to the plurality of electrodes S11 to S14, S21 to S24, and S31 to S34 may be disposed in the second direction (e.g. in the row direction) in which the gate lines extend (see FIG. 5).

As described above, the plurality of electrodes S11 to S14, S21 to S24, and S31 to S34 mentioned herein function as touch electrodes, to all or portions of which the touch driving signal are applied, in the touch driving mode. In the display driving mode, the plurality of electrodes S11 to S14, S21 to S24, and S31 to S34 function as common electrodes, to which a common voltage Vcom is applied, with which the plurality of electrodes form liquid crystal capacitors together with pixel electrodes disposed on the panel.

Here, the pixel electrodes and the common electrodes S11 to S14, S21 to S24, and S31 to S34 may be disposed on the same substrate such that lateral electric fields are generated between the pixel electrodes and the common electrodes S11 to S14, S21 to S24, and S31 to S34 in the display driving mode.

In this aspect, the display device 100 having an in-cell touch structure according to the embodiment may be implemented as, for example, an in-plane switching liquid crystal display (IPS LCD) device that expresses an image on a screen by rotating horizontally-aligned liquid crystal molecules on their axes. The advantages of the IPS LCD include increased resolution, lower power consumption, and a wider viewing angle. More specifically, the display device 100 may be an advanced high performance in-plane switching (AH-IPS) LCD.

Figure 2:
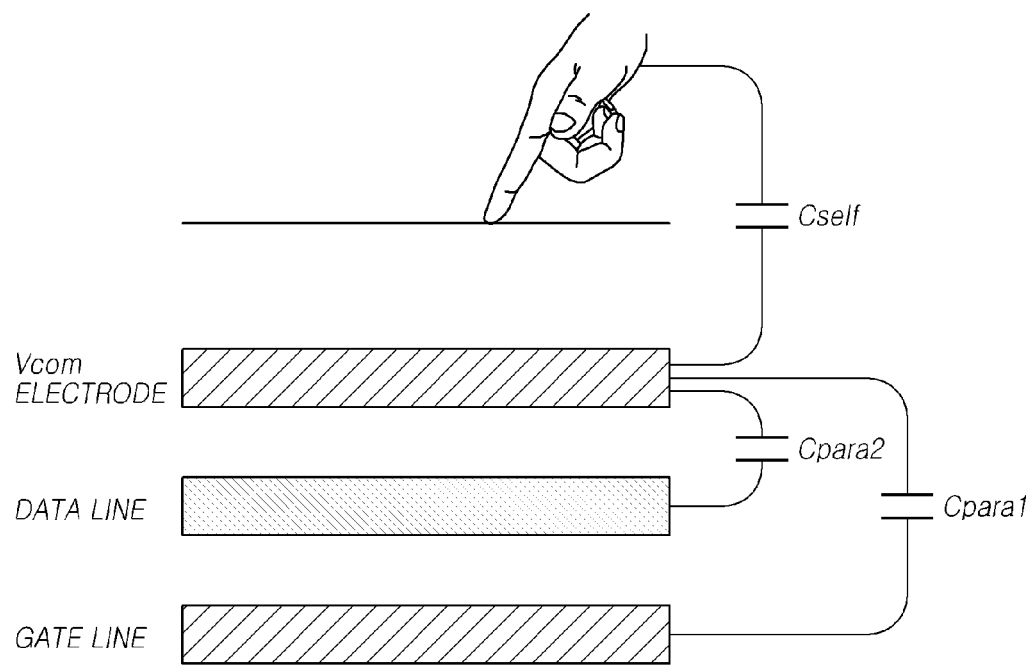
FIG. 2 is a conceptual view illustrating capacitance components formed in the display device having an in-cell touch structure according to the embodiment.

FIG. 2 is a conceptual view illustrating capacitance components Cself, Cpara1, and Cpara2 formed during the touch driving mode of the display device having an in-cell touch structure according to the embodiment.

Referring to FIG. 2, the plurality of electrodes S11 to S14, S21 to S24, and S31 to S34, which function as touch electrodes in the touch driving mode and common electrodes to form liquid crystal capacitors together with the pixel electrodes in the display driving mode, generate capacitance Cself together with the pointer, such as a finger or a pen, in order to detect a touch and the coordinates of the touch in the touch driving mode. The plurality of electrodes S11 to S14, S21 to S24, and S31 to S34 may also generate undesirable parasitic capacitance components Cpara1 and Cpara2 together with the data lines DL and the gate lines GL, both of which are for a display application.

The parasitic capacitance Cpara formed in the touch driving mode acts as a significant load in the touch driving that lowers the accuracy of touch sensing or disables touch sensing. The degree of the parasitic capacitance Cpara may increase with increases in the size of the display device 100 or the display panel 110, thereby causing a more severe problem in touch sensing.

Thus, according to the present embodiment, in the touch driving mode, the scanning driver 130 can further apply a touch gate signal Vtouch_gate to all or portions of the plurality of gate lines GL while the touch driving signal Vtouch_vcom are being applied to all or portions of the plurality of electrodes S11 to S14, S21 to S24, and S31 to S34 functioning as the touch electrodes in the touch driving mode in order to prevent undesirable parasitic capacitance components Cpara1 between the plurality of electrodes S11 to S14, S21 to S24, and S31 to S34 and the plurality of gate lines GL.

In this manner, in the touch driving mode, when the scanning driver 130 further applies the touch gate signal Vtouch_gate to all or portions of the plurality of gate lines GL while the touch circuit 140 is applying the touch driving signal Vtouch_vcom to all or portions of the plurality of electrodes S11 to S14, S21 to S24, and S31 to S34, which function as the touch electrodes in the touch driving mode, no parasitic capacitance component Cpara1 is formed between a touch electrode and the corresponding gate line GL.

In addition, in the touch driving mode, the source driver 120 can further apply a touch data signal Vtouch_data to all or portions of the plurality of data lines DL while the touch driving signal Vtouch_vcom are being applied to all or portions of the plurality of electrodes S11 to S14, S21 to S24, and S31 to S34 functioning as the touch electrodes in the touch driving mode in order to prevent the undesirable parasitic capacitance components Cpara2 between the plurality of electrodes S11 to S14, S21 to S24, and S31 to S34 and the data lines DL.

As such, in the touch driving mode, when the source driver 120 further applies the touch data signal Vtouch_data to all or portions of the plurality of data lines DL while the touch circuit 140 is applying the touch driving signal Vtouch_vcom to all or portions of the plurality of electrodes S11 to S14, S21 to S24, and S31 to S34 functioning as the touch electrodes, no potential difference forms between a touch electrode and the corresponding data line DL, whereby no parasitic capacitance component Cpara2 is formed between the touch electrode and the corresponding data line DL.

Alternatively, the source driver 120 can further apply the touch data signal Vtouch_data to all or portions of the data lines DL and the scanning driver 130 can further apply the touch gate signal Vtouch_gate to all or portions of the gate lines GL while the touch driving signal Vtouch_vcom are being applied to all or portions of the plurality of electrodes S11 to S14, S21 to S24, and S31 to S34.

As described above, in the touch driving mode, the touch data signal Vtouch_data is further applied to all or portions of the data lines DL and the touch gate signal Vtouch_gate is further applied to all or portions of the gate lines GL while the touch driving signal Vtouch_vcom are being applied to all or portions of the plurality of electrodes S11 to S14, S21 to S24, and S31 to S34 functioning as the touch electrodes. This can consequently remove any resistor capacitor (RC) load that would otherwise be caused by the parasitic capacitance component Cpara1 or Cpara2, formed by a touch electrode together with the corresponding gate line GL or the corresponding data line DL, and improve sensitivity. In addition, an in-cell touchscreen panel not only for a medium-sized or larger display device but also for a small display device can be realized.

Hereinafter, the panel 110 of the display device 100 having an in-cell touch structure according to the embodiment, a method of applying a common voltage and touch driving signal Vtouch_vcom to the plurality of electrodes S11 to S14, S21 to S24, and S31 to S34 functioning as both common electrodes and touch electrodes, a method of applying a data voltage and a touch data signal Vtouch_data to the data lines DL, and a method of applying a data voltage and a touch gate signal Vtouch_gate to the gate lines GL will be described in greater detail.

First, the panel 110 of the display device 100 having an in-cell touch structure according to the embodiment will be described in greater detail with reference to FIG. 3 to FIG. 6.

FIG. 3 is a schematic configuration view illustrating the exemplary panel 110 of the display device 100 having an in-cell touch structure according to the embodiment. Referring to FIG. 3, as described above, the panel 110 includes the plurality of data lines DL, the plurality of gate lines GL, and the plurality of electrodes S11 to S14, S21 to S24, and S31 to S34.

As described above, the panel 110 can operate in both the display driving mode and the touch driving mode.

In this regard, the plurality of data lines DL and the plurality of gate lines GL disposed on the panel 110 are components enabling the panel 110 to act as the display panel.

In addition, the plurality of electrodes S11 to S14, S21 to S24, and S31 to S34 disposed on the panel 110 are components enabling the panel 110 to act as both a display panel and a touchscreen panel.

More specifically, when the panel 110 acts as the display panel, i.e. when the panel 110 is driven in the display driving mode, a common voltage Vcom is applied to the plurality of electrodes S11 to S14, S21 to S24, and S31 to S34, which in turn function as common electrodes (hereinafter also referred to "Vcom electrodes") that form liquid crystal capacitors together with pixel electrodes (not shown).

When the panel 110 acts as the touchscreen panel, i.e. when the panel 110 is driven in the touch driving mode, a touch driving voltage is applied to the plurality of electrodes S11 to S14, S21 to S24, and S31 to S34, which in turn form capacitors together with a touch pointer (e.g. a finger or a pen), and function as "touch electrodes" to measure the capacitance levels of the capacitors formed in this manner.

In other words, the plurality of electrodes S11 to S14, S21 to S24, and S31 to S34 function as the "common electrodes" or "Vcom electrodes" in the display driving mode and as the "touch electrodes" in the touch driving mode.

As described above, while the plurality of electrodes S11 to S14, S21 to S24, and S31 to S34 basically function as the touch electrodes (also referred to as touch sensors) used in the touch driving (touch sensing), the plurality of electrodes S11 to S14, S21 to S24, and S31 to S34 may also be multi-use electrodes that function as the touch electrodes used in the touch driving (touch sensing) or as the common electrodes to which a common voltage required for the display driving is applied, depending on the driving mode. The common voltage may be a common voltage for forming an electric field in correspondence with a pixel voltage in an LCD or may be a cathode voltage corresponding to an anode voltage (a pixel voltage) of an organic light-emitting diode (OLED).

The plurality of electrodes S11 to S14, S21 to S24, and S31 to S34 have the common voltage Vcom applied thereto in the display driving mode and the touch driving signal Vtouch_vcom applied thereto in the touch driving mode.

Thus, as illustrated in FIG. 3, signal lines SL11 to SL14, SL21 to SL24, and SL31 to SL34 disposed in a direction parallel to the direction of the data lines are connected to the plurality of electrodes S11 to S14, S21 to S24, and S31 to S34 in order to transfer the touch driving signal Vtouch_vcom to the plurality of electrodes S11 to S14, S21 to S24, and S31 to S34.

With this configuration, in the touch driving mode, the touch driving signal Vtouch_vcom generated by the touch circuit 140 are transferred to all or portions of the plurality of electrodes S11 to S14, S21 to S24, and S31 to S34 via the signal lines SL11 to SL14, SL21 to SL24, and SL31 to SL34. In the display driving mode, the common voltage Vcom supplied by a common voltage supply (not shown) is applied to the plurality of electrodes S11 to S14, S21 to S24, and S31 to S34 via the signal lines SL11 to SL14, SL21 to SL24, and SL31 to SL34.

Referring to FIG. 3, in the display driving mode, the source driver 120 supplies a data voltage to the plurality of data lines DL, and the scanning driver 130 sequentially supplies a scanning signal to the plurality of gate lines GL.

Referring to FIG. 3, in the touch driving mode, the source driver 120 supplies a touch data signal Vtouch_data to at least one data line among the plurality of data lines DL or a touch gate signal Vtouch_gate to at least one gate line among the plurality of gate lines GL.

Referring to FIG. 3, pixels P are correspondingly defined at points on the panel 110 in which the plurality of data lines DL intersect the plurality of gate lines GL. Each of the plurality of pixels P may be one of a red (R) pixel, a green (G) pixel, and a blue (B) pixel.

Referring to FIG. 3, two or more pixels P may be defined in an area (hereinafter also referred to as a "unit touch electrode area") in which each of the plurality of electrodes S11 to S14, S21 to S24, and S31 to S34 functioning as both the common electrodes and the touch electrodes is disposed. That is, each of the plurality of electrodes S11 to S14, S21 to S24, and S31 to S34 corresponds to two or more pixels P.

For example, 24×3 data lines DL and 24 gate lines GL may be disposed in a single area (unit touch electrode area) in which each of the plurality of electrodes S11 to S14, S21 to S24, and S31 to S34 functioning as both the common electrodes and the touch electrodes is disposed, thereby defining 24×3×24 pixels P.

Each of the plurality of electrodes S11 to S14, S21 to S24, and S31 to S34 functioning as both the common electrodes and the touch electrodes may be provided as a block-shaped pattern as illustrated in FIG. 3, or in some cases, may be provided as a pattern including a finger-shaped portion.

An example in which each of the plurality of electrodes S11 to S14, S21 to S24, and S31 to S34 functioning as both the common electrodes and the touch electrodes includes the finger-shaped portion can be discussed with reference to a top-plan view of FIG. 25 and a cross-sectional view of FIG. 26.

Although the plurality of electrodes functioning as both the touch electrodes and the common electrodes mentioned herein are illustrated in the drawings as being 12 electrodes arranged in the shape of a 3×4 matrix containing 3 rows and 4 columns, this is only illustrative for the sake of description. The plurality of electrodes functioning as both the touch electrodes and the common electrodes may be arranged in a variety of matrix shapes and in various numbers in consideration of the size of the display device 100 having an in-cell touch structure and the panel 110, the design criteria of the touch system, and the like.

Figure 4:
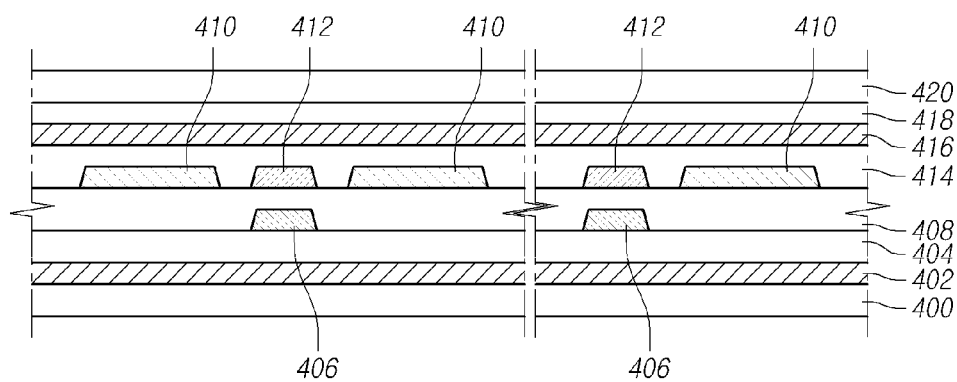
FIG. 4 is a cross-sectional view illustrating an exemplary panel of the display device having an in-cell touch structure according to the embodiment.

FIG. 4 is a cross-sectional view illustrating an exemplary panel 110 of the display device 100 having an in-cell touch structure according to the embodiment.

FIG. 4 illustrates the cross-section of an area (unit touch electrode area) in which a single electrode among the plurality of electrodes S11 to S14, S21 to S24, and S31 to S34 functioning as both the common electrodes and the touch electrodes is disposed.

Referring to FIG. 4, in the panel 110 of the display device 100 having an in-cell touch structure according to the embodiment, for example, gate lines 402 are disposed on a lower substrate 400 in the second direction (in a row direction, the right and left direction in FIG. 4), and a gate insulating layer 404 is disposed thereon.

Data lines 406 are disposed on the gate insulating layer 404 in the first direction (a column direction perpendicular to the paper surface in FIG. 4), and a first passivation layer 408 is disposed thereon.

Pixel electrodes 410 and signal lines 412 of each pixel area are disposed on the first passivation layer 408, and a second passivation layer 414 is disposed thereon. The signal lines 412 are connected from the plurality of electrodes S11 to S14, S21 to S24, and S31 to S34 functioning as both the common electrodes and the touch electrodes to the touch circuit 140 to transfer a common voltage Vcom generated by the common voltage supply (not shown) to the plurality of electrodes S11 to S14, S21 to S24, and S31 to S34 in the display driving mode and touch driving signal generated by the touch circuit 140 to the plurality of electrodes S11 to S14, S21 to S24, and S31 to S34 in the touch driving mode.

A single electrode 416 functioning as both a common electrode and a touch electrode is disposed on the second passivation layer 414, and a liquid crystal layer 418 is disposed thereon. The electrode 416 functioning as both the common electrode and the touch electrode is one of the plurality of electrodes S11 to S14, S21 to S24, and S31 to S34, and may be formed as a block-shaped pattern.

An upper substrate 420 on which a black matrix, a color filter, and the like are formed is positioned on the liquid crystal layer 418.

FIG. 5 is a schematic configuration view illustrating another exemplary panel 110 of the display device 100 having an in-cell touch structure according to the embodiment.

Referring to FIG. 5, unlike FIG. 3, the signal lines SL11 to SL14, SL21 to SL24, and SL31 to SL34 connected to the plurality of electrodes S11 to S14, S21 to S24, and S31 to S34 to transfer touch driving signal Vtouch_vcom or a common voltage Vcom extend parallel to the second direction (e.g. in a row direction) in which the gate lines GL are disposed.

In this case, the touch driving signal generated by the touch circuit 140 or the common voltage generated or supplied by the common voltage supply (not shown) are transferred to all or portions of the plurality of electrodes S11 to S14, S21 to S24, and S31 to S34 via the signal lines SL11 to SL14, SL21 to SL24, and SL31 to SL34 disposed parallel to the gate lines GL.

Figure 6:
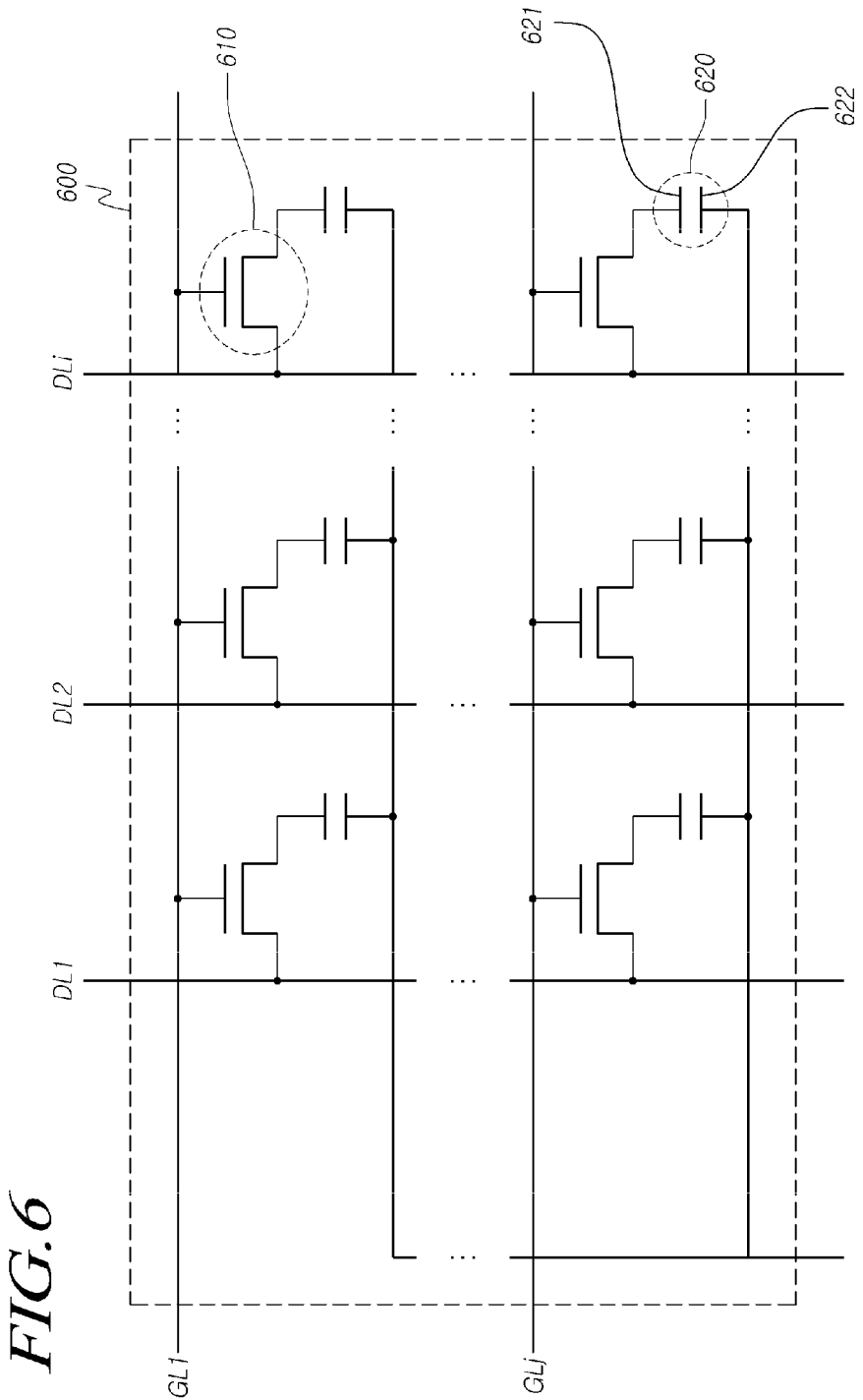
FIG. 6 is an equivalent circuit diagram of a unit touch electrode area in the panel of the display device having an in-cell touch structure according to the embodiment.

FIG. 6 is an equivalent circuit diagram of a unit touch electrode area 600 in the panel 110 of the display device 100 having an in-cell touch structure according to the embodiment.

Referring to FIG. 6, a single common electrode functioning as a touch electrode is disposed in the unit touch electrode area 600 in the panel 110 of the touch screen integrated display device 100 according to an embodiment, and a plurality of pixels are defined in the unit touch electrode area 600.

Referring to FIG. 6, i number of data lines DL1 to DLi and j number of gate lines GL1 to GLj are disposed in the unit touch electrode area 600, thereby defining i×j number of unit pixels (sub-pixels).

Referring to FIG. 6, a transistor 610 is disposed in each of pixel areas (unit pixel area). In the transistor 610, a source electrode (or a drain electrode) is connected to a data line of the data lines DL1 to DLi, a gate electrode is connected to a gate line of the gate lines GL1 to GLj, and a drain electrode (or a source electrode) is connected to a pixel electrode 621.

Referring to FIG. 6, the pixel electrode 621 connected to the drain electrode (or the source electrode) of the transistor 610 disposed in each of the pixel areas forms a liquid crystal capacitor 620 together with a second electrode 622.

The second electrode 622 disposed in each of the pixel areas is a single electrode among the plurality of electrodes S11 to S14, S21 to S24, and S31 to S34. The second electrode 622 functions as a common electrode to which a common voltage Vcom is applied and as an electrode to which a touch driving signal Vtouch_vcom is applied in the touch driving mode.

Hereinafter, a method of driving the display device 100 having an in-cell touch structure according to the embodiment will be described with reference to FIG. 7 and FIG. 8. Next, a method of applying a common voltage Vcom and touch driving signal Vtouch_vcom to the plurality of electrodes S11 to S14, S21 to S24, and S31 to S34 functioning as both the common electrodes and the touch electrodes, a method of applying a data voltage Vdata and a touch data signal Vtouch_data to the data lines LD, and a method of applying a scanning signal VGH/VGL and a touch gate signal Vtouch_gate to the gate lines GL will be described in greater detail with reference to FIG. 9 to FIG. 16.

Figure 7:
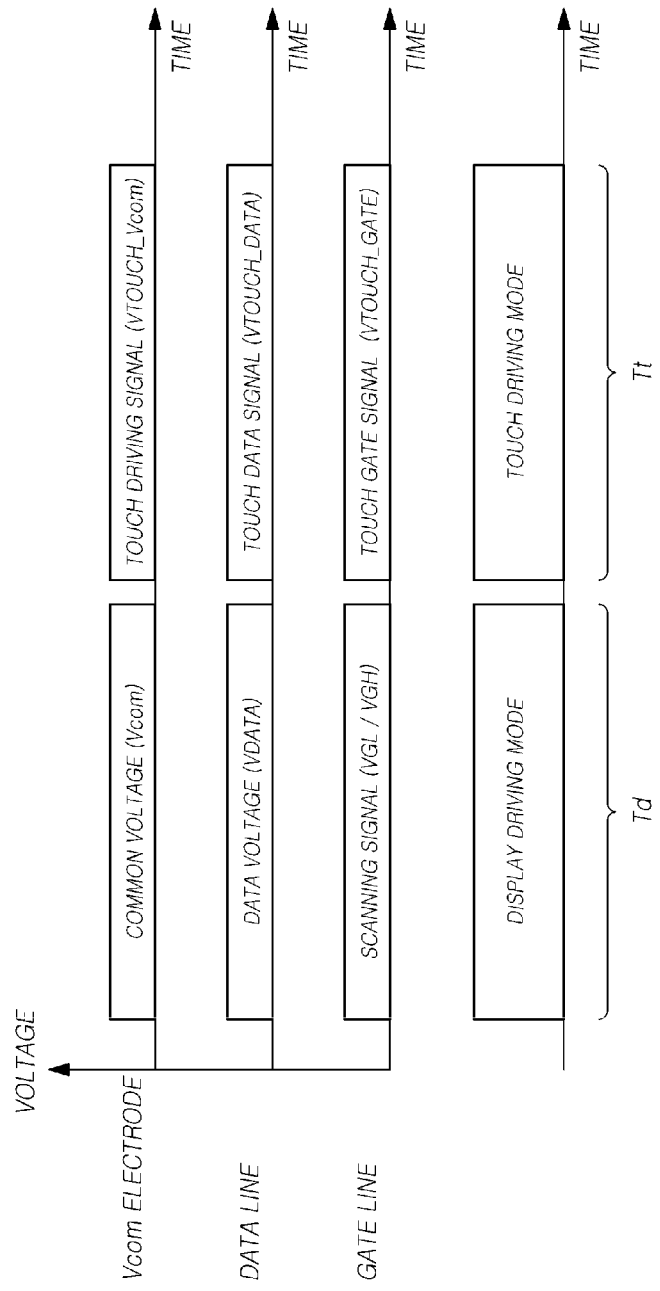
FIG. 7 is a conceptual view illustrating a method of driving the display device having an in-cell touch structure according to the embodiment.

FIG. 7 is a conceptual view illustrating a method of driving the display device 100 having an in-cell touch structure according to the embodiment.

Referring to FIG. 7, the display device 100 having an in-cell touch structure according to the embodiment operates alternately in the display driving mode and the touch driving mode. In some cases, the display device 100 can only operate in one of the display driving mode and the touch driving mode for a specific period of time.

Referring to FIG. 7, the operating time Td of the display driving mode may be set to be equal to the operating time Tt of the touch driving mode. Alternatively, the operating time Td of the display driving mode may be set to be longer than the operating time Tt of the touch driving mode, or vice versa. In some cases, the operating time Td of the display driving mode and the operating time Tt of the touch driving mode can be set to adaptively change depending on the current situation of the display device 100 having an in-cell touch structure.

Referring to FIG. 7, the method of driving the display device 100 having an in-cell touch structure according to the embodiment basically includes a display driving operation and a touch driving operation. The display driving operation is executed during the period of the display driving, and includes applying a common voltage Vcom to the plurality of common electrodes (Vcom electrodes) S11 to S14, S21 to S24, and S31 to S34, supplying a data voltage Vdata to the plurality of data lines DL, and sequentially supplying a scanning signal VGL or VGH to the plurality of gate lines GL. The touch driving operation is executed during the period of the touch driving, and includes applying touch driving signal Vtouch_vcom to all or portions of the plurality of common electrodes S11 to S14, S21 to S24, and S31 to S34.

In the touch driving operation, concurrently with the touch circuit 140 applying a touch driving signal Vtouch_vcom to at least one common electrode among the plurality of common electrodes S11 to S14, S21 to S24, and S31 to S34, the source driver 120 can further apply a touch data signal Vtouch_data to at least one data line among the plurality of data lines DL or the scanning driver 130 can further apply a touch gate signal Vtouch_gate to at least a single gate line among the plurality of gate lines GL.

Figure 8:
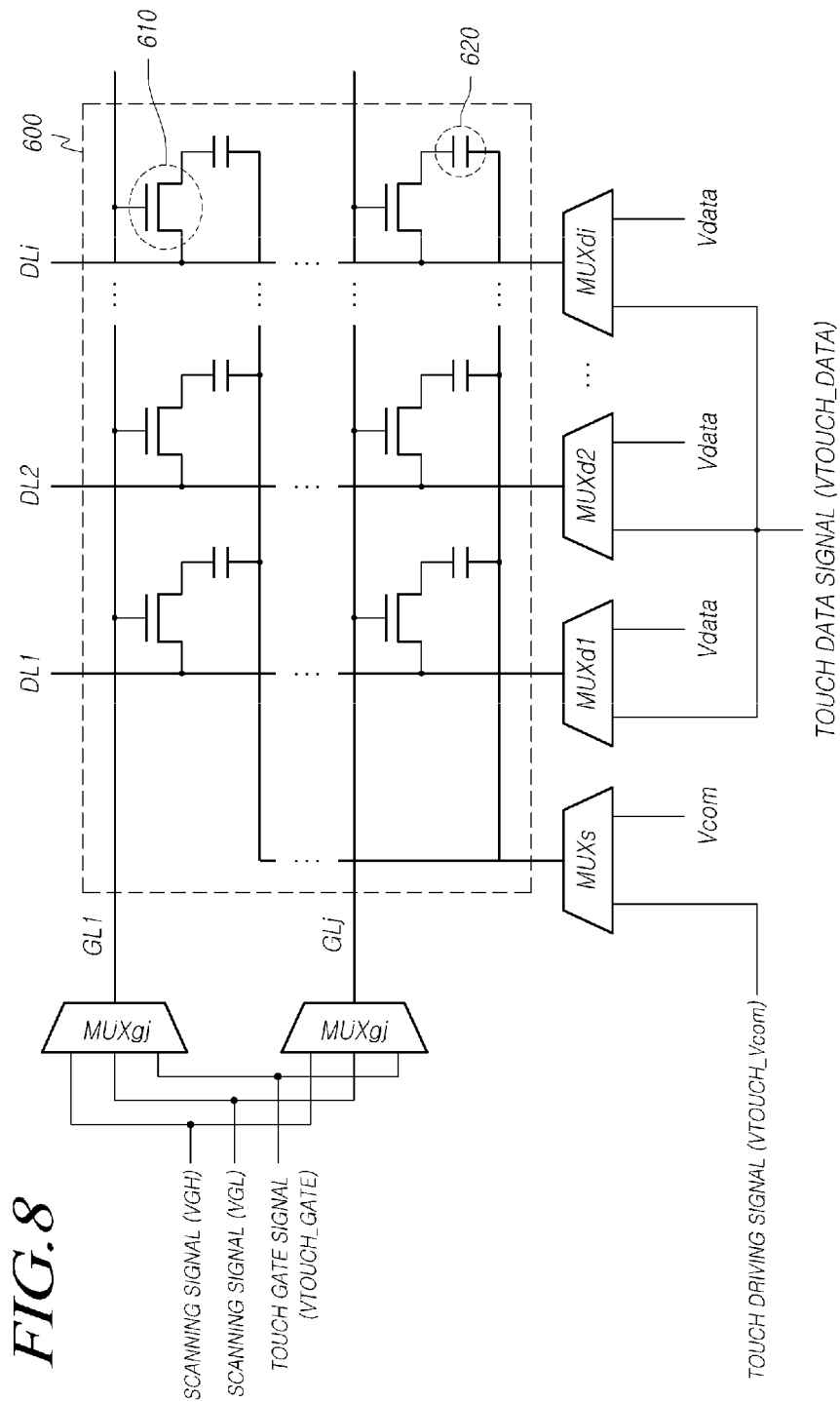
FIG. 8 is an equivalent circuit diagram of the unit touch electrode area illustrating a method of supplying a variety of voltages in relation to the method of driving the display device having an in-cell touch structure according to the embodiment.

FIG. 8 is an equivalent circuit diagram of the unit touch electrode area 600 in relation to the method of driving the display device 100 having an in-cell touch structure according to the embodiment, wherein, in the display driving mode, a common voltage Vcom, a data voltage Vdata, and a scanning signal VGH or VGL are supplied (applied) to the common electrode S11, the data lines DL1 to DLi, and the gate lines GL1 to GLj, and in the touch driving mode, a touch driving signal Vtouch_vcom, a touch data signal Vtouch_data, and a touch gate signal Vtouch_gate are supplied (applied) to the common electrode S11, the data lines DL1 to DLi, and the gate lines GL1 to GLj.

Referring to FIG. 8, i number of data lines DL1 to DLi and j number of gate lines GL1 to GLj extend through the unit touch electrode area 600, corresponding to an area in which a single electrode among the plurality of electrodes S11 to S14, S21 to S24, and S31 to S34 is disposed.

Thus, referring to FIG. 8, i×j number of pixels P are defined in the unit touch electrode area 600 corresponding to the area in which a single electrode S11 among the plurality of electrodes S11 to S14, S21 to S24 and S31 to S34 is disposed.

In addition, referring to FIG. 8, a single transistor 610 is disposed in each pixel area of the pixels P, and in the display driving mode, a single liquid crystal capacitor 620 is defined.

First, the application (supply) of a variety of signals (a data voltage, a scanning signal, and a common voltage) in the display driving mode will be described.

Referring to FIG. 8, in the display driving mode, the source driver 120 supplies a corresponding data voltage Vdata (also referred to as a "pixel voltage") to the i number of data lines DL1 to DLi through i number of data line multiplexers MUXd1 to MUXdi.

Referring to FIG. 8, in the display driving mode, the scanning driver 130 supplies a turn-on voltage level scanning signal, e.g. a scanning signal VGH, to a single gate line among the j number of gate lines GL1 to GLj and a turn-off voltage level scanning signal, e.g. a scanning signal VGL, to the remaining gate lines through j number of gate line multiplexers MUXg1 to MUXgj, thereby sequentially driving the j number of gate lines GL1 to GLj.

Referring to FIG. 8, in the display driving mode, for example, the common voltage supply supplies a common voltage Vcom to all of the plurality of electrodes S11 to S14, S21 to S24, and S31 to S34 including the electrode S11 corresponding to the unit touch electrode area 600 through a common electrode (or touch electrode) multiplexer MUXs of the data driver unit 120.

Next, the application (supply) of a variety of signals (a touch driving signal, a touch data signal, and a touch gate signal) in the touch driving mode will be described.

Referring to FIG. 8, in the touch driving mode, for example, the touch circuit 140 supplies a touch driving signal Vtouch_vcom to the electrode S11 corresponding to the unit touch electrode area 600, as required, through the touch electrode (or common electrode) multiplexer MUXs.

Referring to FIG. 8, in the touch driving mode, the scanning driver 130 supplies a touch gate signal Vtouch_gate to the j number of gate lines GL1 to GLj, as required, through the j number of gate line multiplexers MUXg1 to MUXgj.

In addition, referring to FIG. 8, in the touch driving mode, the source driver 120 supplies a touch data signal Vtouch_data to the i number of data lines DL1 to DLi, as required, through the i number of data line multiplexers MUXd1 to MUXdi.

The j number of gate line multiplexers MUXg1 to MUXgj illustrated in FIG. 8 may be implemented as a single gate line multiplexer.

Hereinafter, a method of applying touch driving signal Vtouch_vcom to the plurality of electrodes S11 to S14, S21 to S24, and S31 to S34 functioning as touch electrodes in the touch driving mode will be described with reference to FIG. 9 to FIG. 12.

Figure 9:
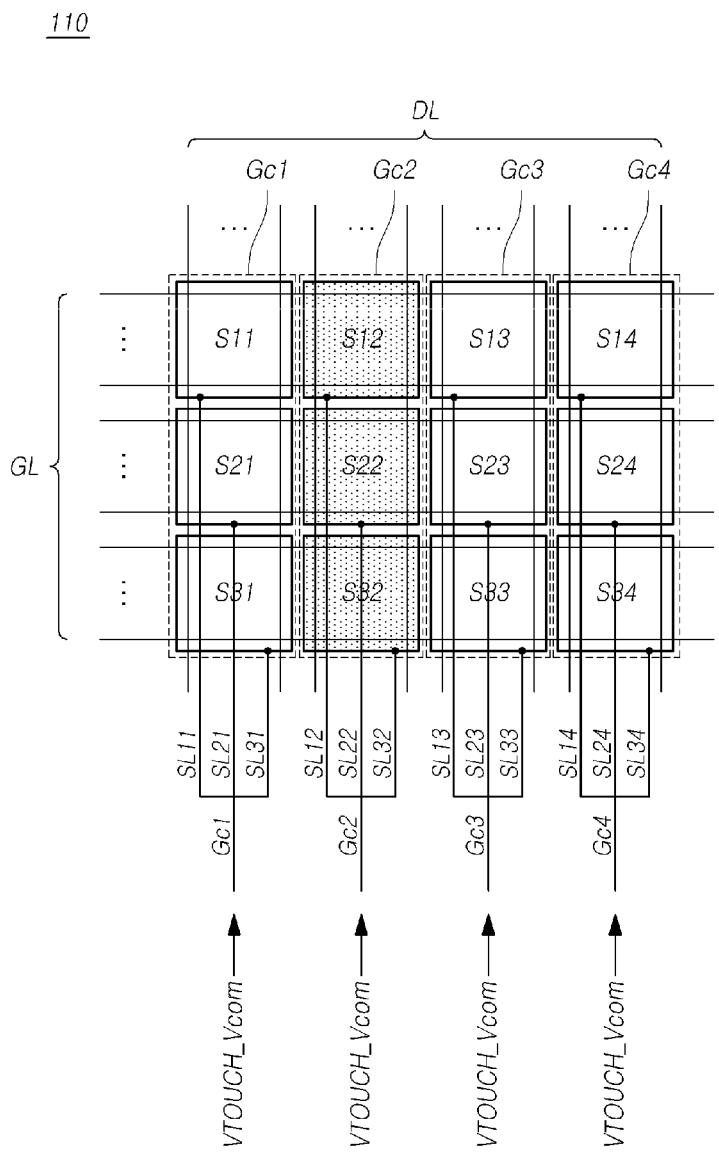
FIG. 9 and FIG. 10 are schematic views illustrating a method of applying touch driving signals to the common electrodes functioning as touch electrodes in the display device having an in-cell touch structure according to the embodiment when touch sensing is performed according to touch electrode columns (columnar touch electrode groups)
Figure 10:
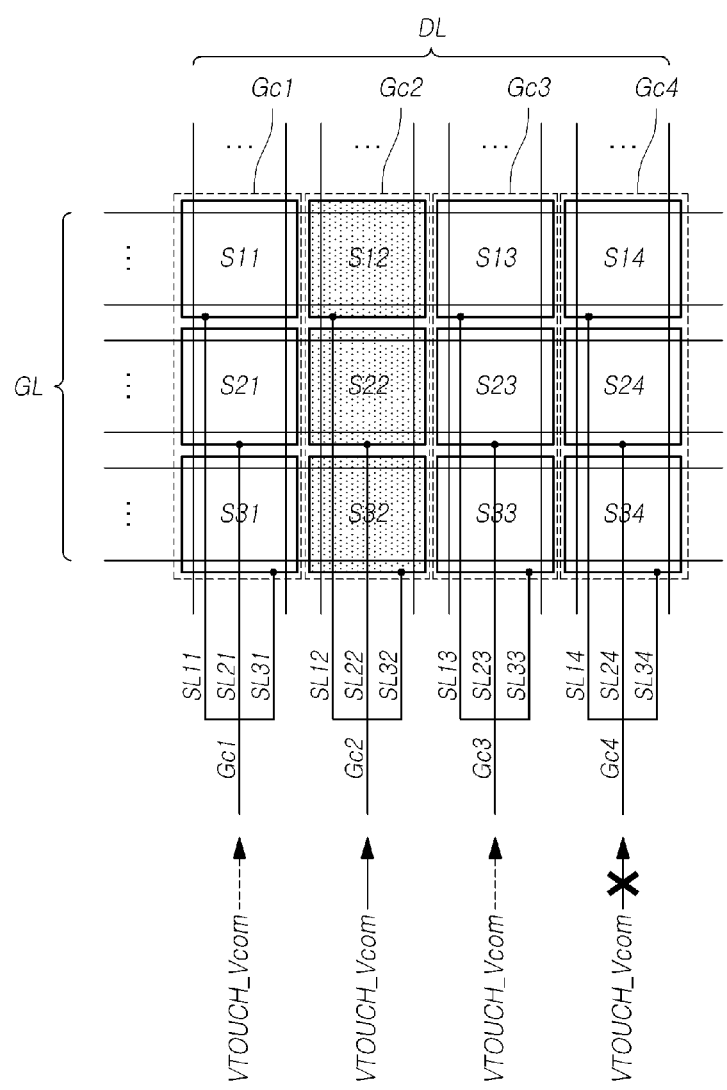
Figure 11:
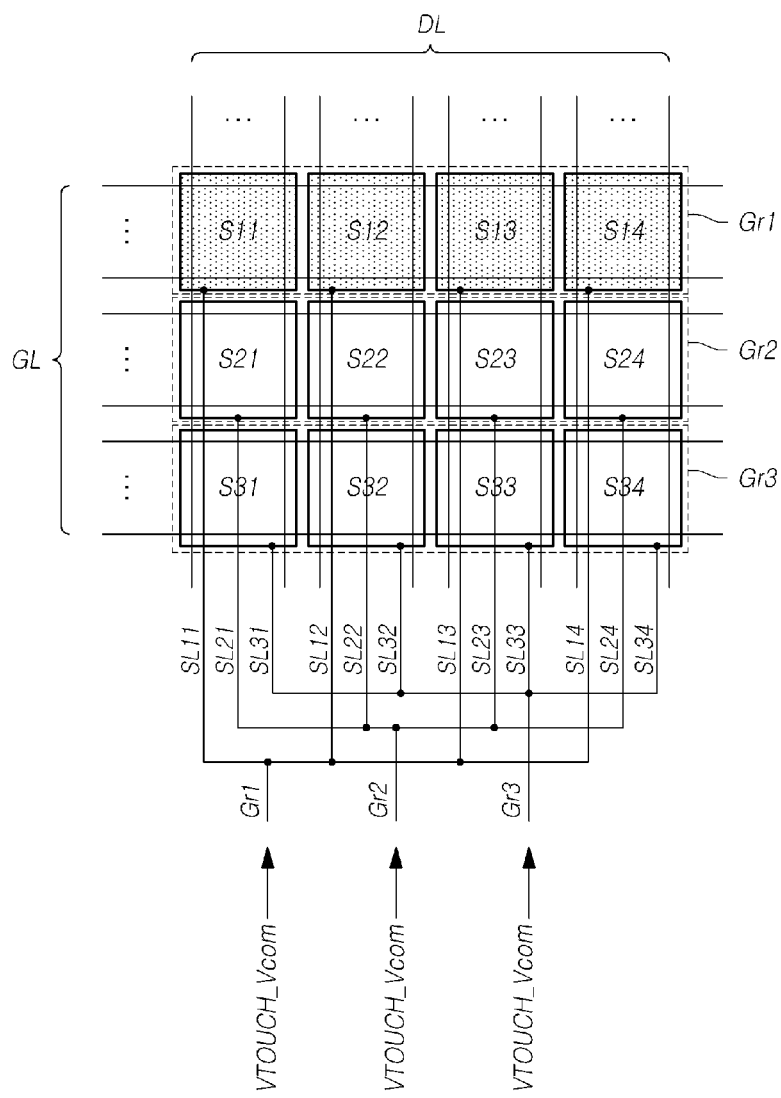
FIG. 11 and FIG. 12 are schematic views illustrating a method of applying touch driving signals to the common electrodes functioning as touch electrodes in the display device having an in-cell touch structure according to the embodiment when touch sensing is performed according to touch electrode rows (row-direction touch electrode groups)
Figure 12:
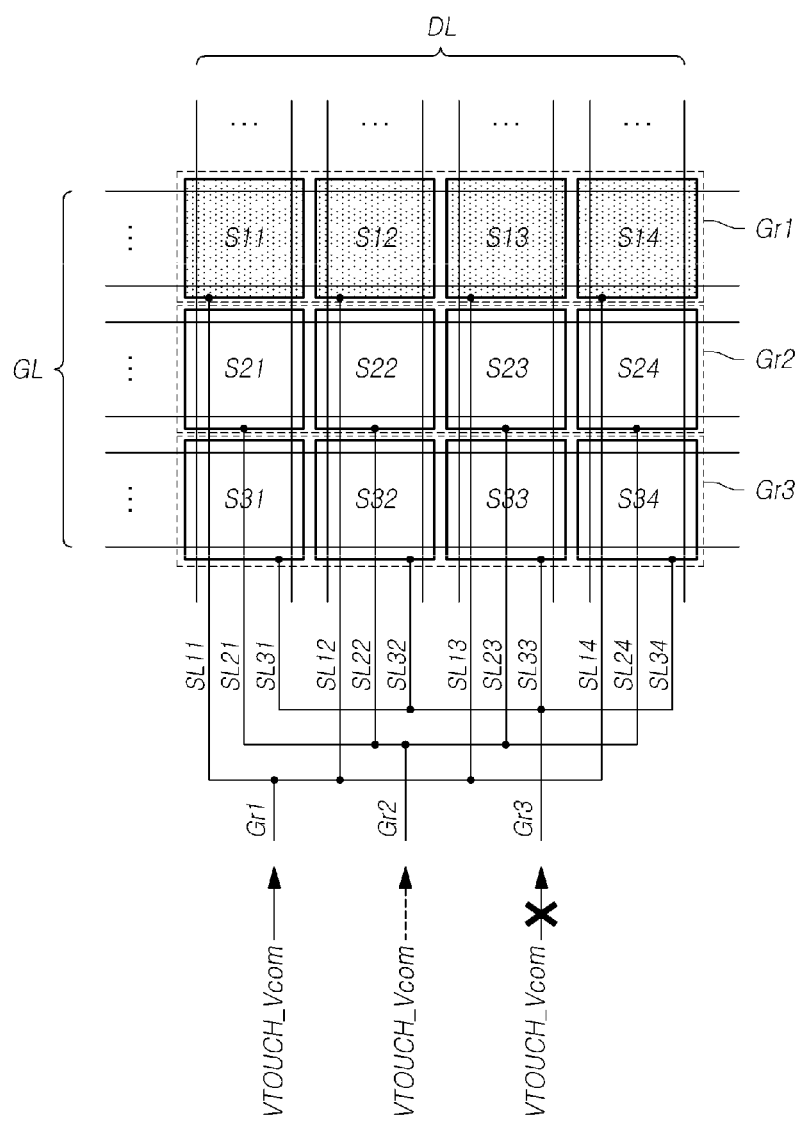

Here, FIG. 9 and FIG. 10 are views illustrating a case in which the plurality of electrodes S11 to S14, S21 to S24, and S31 to S34 functioning as touch electrodes are grouped in a column direction such that touch sensing is performed in the column direction, and FIG. 11 and FIG. 12 are views illustrating a case in which the plurality of electrodes S11 to S14, S21 to S24, and S31 to S34 functioning as touch electrodes are grouped in a row direction such that touch sensing is performed in the row direction.

Before a description in conjunction with the drawings is made, a method of applying the touch driving signal Vtouch_vcom to the plurality of electrodes S11 to S14, S21 to S24, and S31 to S34 functioning as touch electrodes in the touch driving mode will be described in brief.

In the touch driving mode, the touch circuit 140 may simultaneously apply the touch driving signal to all of the plurality of electrodes S11 to S14, S21 to S24, and S31 to S34 functioning as touch electrodes or apply the touch driving signal to portions of the plurality of electrodes S11 to S14, S21 to S24, and S31 to S34.

When the touch circuit 140 applies the touch driving signal to portions of the plurality of electrodes S11 to S14, S21 to S24, and S31 to S34, the touch circuit 140 sequentially selects an electrode group among the plurality of electrode groups, including the plurality of electrodes S11 to S14, S21 to S24, and S31 to S34, as a touch sensing electrode group and applies the touch driving signal to the touch sensing electrode group.

In this case, the touch circuit 140 can further apply the touch driving signal to at least one electrode group adjacent to the touch sensing electrode group in order to improve the accuracy of touch sensing.

FIG. 9 and FIG. 10 are schematic views illustrating a method of applying a touch driving signal Vtouch_vcom to the common electrodes S11 to S14, S21 to S24, and S31 to S34 functioning as touch electrodes in the display device 100 having an in-cell touch structure according to the embodiment when touch sensing is performed according to the touch electrode columns (columnar touch electrode groups Gc1, Gc2, Gc3, and Gc4).

FIG. 9 and FIG. 10 illustrate an example in which a touch sensing electrode group (a group of electrodes in a common column line) in which touch sensing is performed is the touch electrode group Gc2, including the electrodes S12, S22, and S32, among the four columnar touch electrode groups Gc1, Gc2, Gc3, and Gc4.

Referring to FIG. 9, the touch driving signal Vtouch_vcom may be applied to all of the plurality of electrodes S11 to S14, S21 to S24, and S31 to S34 through the signal lines SL11, SL21, SL31, SL12, SL22, SL32, SL13, SL23, SL33, SL14, SL24, and SL34. That is, the touch driving signal Vtouch_vcom are applied to all of the four columnar touch electrode groups Gc1 to Gc4.

As another application method, as illustrated in FIG. 10, the touch driving signal Vtouch_vcom may be applied to portions of the plurality of electrodes S11 to S14, S21 to S24, and S31 to S34.

More specifically, referring to FIG. 10, the touch driving signal Vtouch_vcom are applied to the electrodes S12, S22, and S32 of the touch sensing electrode group Gc2 through the corresponding signal lines SL12, SL22, and SL32.

Here, touch driving signal Vtouch_vcom may not be applied to the electrodes S11, S21, S31, S13, S23, S33, S14, S24, and S34 of the other electrode groups Gc1, Gc3 and Gc4 with the exception of the touch sensing electrode group Gc2.

At this time, referring to FIG. 10, the touch driving signal Vtouch_vcom may be simultaneously applied to the electrodes S11, S21, S31, S13, S23, and S33 of the electrode groups Gc1 and Gc3 adjacent to the touch sensing electrode group Gc2 while being applied to the electrodes S12, S22, and S32 of the touch sensing electrode group Gc2 in order to increase the efficiency of touch sensing.

In this case, no touch driving signal Vtouch_vcom are applied to the electrodes S14, S24, and S34 of the electrode group Gc4, non-adjacent to the touch sensing electrode group Gc2.

FIG. 11 and FIG. 12 are schematic views illustrating a method of applying a touch driving signal to the common electrodes functioning as touch electrodes in the display device 100 having an in-cell touch structure according to the embodiment when touch sensing is performed according to the touch electrode rows (row-direction touch electrode groups Gr1, Gr2, and Gr3).

FIG. 11 and FIG. 12 illustrate an example in which a touch sensing electrode group (a group of electrodes in a common row line) in which touch sensing is performed is the touch electrode group Gr1, including the electrodes S11, S12, S13, and S14, among the three row-direction touch electrode groups Gr1, Gr2, and Gr3.

Referring to FIG. 11, touch driving signal Vtouch_vcom may be applied to all of the plurality of electrodes S11 to S14, S21 to S24, and S31 to S34 through the signal lines SL11, SL21, SL31, SL12, SL22, SL32, SL13, SL23, SL33, SL14, SL24, and SL34. That is, the touch driving signal Vtouch_vcom are applied to all of the three row-direction touch electrode groups Gr1 to Gr3.

As another application method, as illustrated in FIG. 12, the touch driving signal Vtouch_vcom may be applied to portions of the plurality of electrodes S11 to S14, S21 to S24, and S31 to S34.

More specifically, referring to FIG. 12, the touch driving signal Vtouch_vcom are applied to the electrodes S11, S12, S13, and S14 of the touch sensing electrode group Gr1 through the corresponding signal lines SL11, SL12, SL13, and SL14.

Here, no touch driving signal Vtouch_vcom may be applied to the electrodes S21, S22, S23, S24, S31, S32, S33, and S34 of the other electrodes groups Gr2 and Gr3 with the except of the touch sensing electrode group Gr1.

At this time, referring to FIG. 12, the touch driving signal Vtouch_vcom may be simultaneously applied to the electrodes S21, S22, S23, and S24 of the electrode group Gr2 adjacent to the touch sensing electrode group Gr1 while being applied to the electrodes S11, S12, S13, and S14 of the touch sensing electrode group Gr1 in order to increase the efficiency of touch sensing.

In this case, no touch driving signal Vtouch_vcom are applied to the electrodes S31, S32, S33, and S34 of the electrode group Gr3, non-adjacent to the touch sensing electrode group Gr1.

As in FIG. 10 and FIG. 12, since the touch driving signal Vtouch_vcom are applied to portions of the plurality of electrodes S11 to S14, S21 to S24, and S31 to S34 functioning as touch electrodes, it is possible to significantly reduce the amount of power consumed by the display device 100 having an in-cell touch structure.

Hereinafter, a method of applying a touch data signal Vtouch_data and a touch gate signal Vtouch_gate to data lines and gate lines in the touch driving mode will be described with reference to FIG. 13 to FIG. 16.

Figure 13:
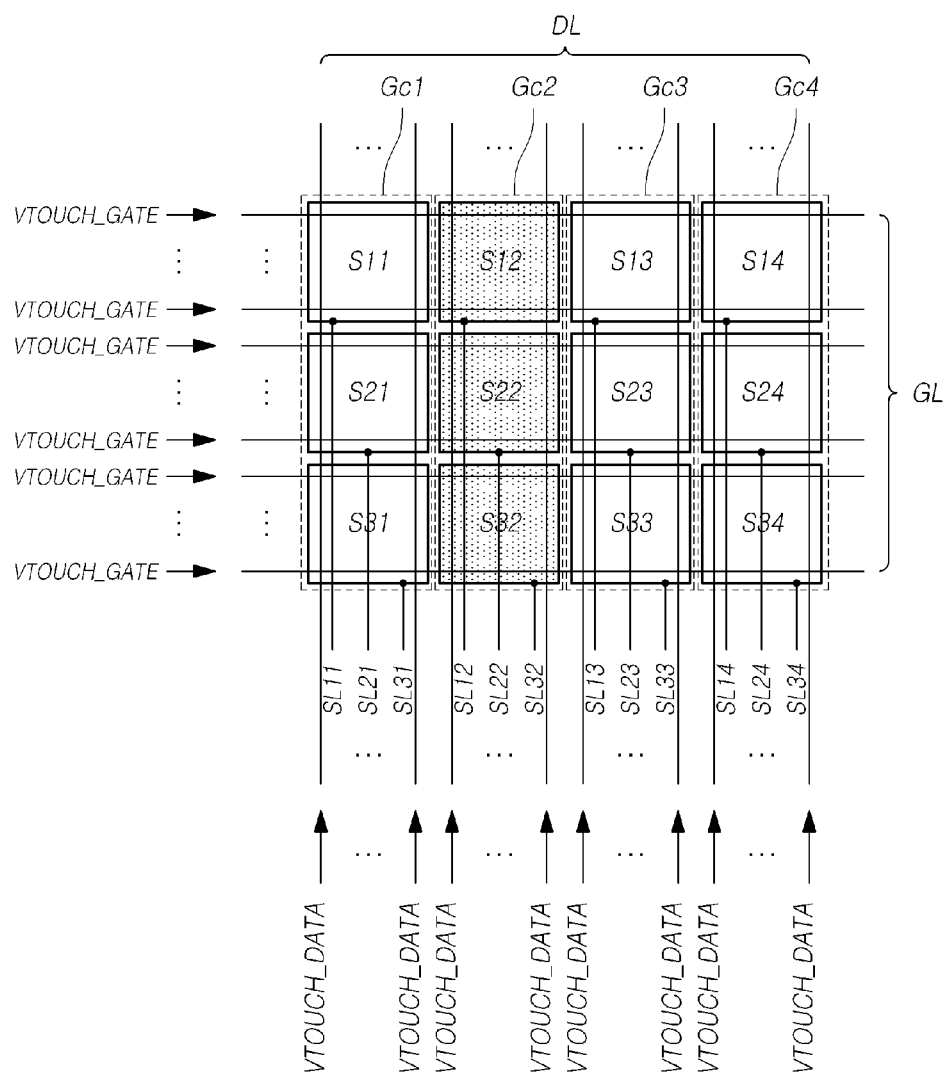
FIG. 13 and FIG. 14 are schematic views illustrating a method of applying touch data signals and touch gate signals to the data lines and the gate lines in the display device having an in-cell touch structure according to the embodiment when touch sensing is performed according to touch electrode columns (columnar touch electrode groups)
Figure 14:
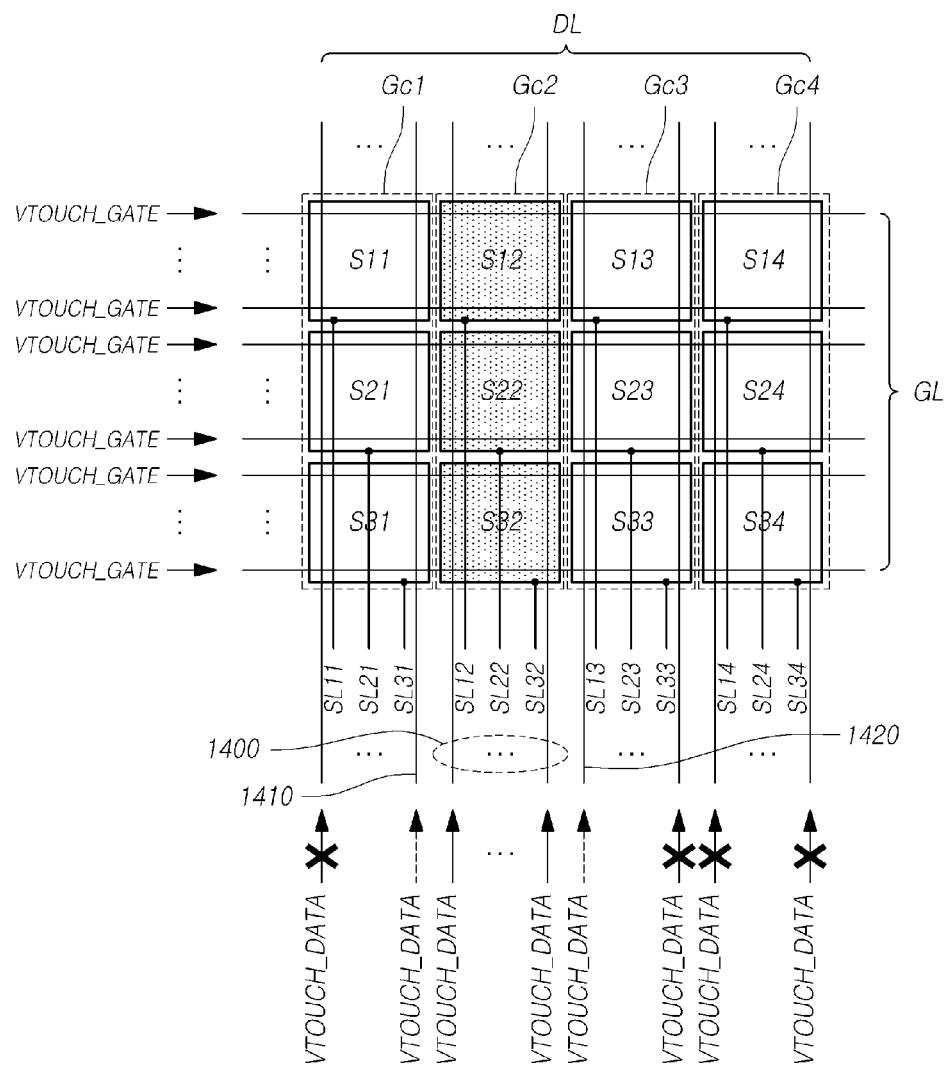

FIG. 13 and FIG. 14 are views illustrating a method of applying a touch data signal Vtouch_data and a touch gate signal Vtouch_gate to the data lines and the gate lines in the display device 100 having an in-cell touch structure according to the embodiment when touch sensing is performed according to the touch electrode columns (columnar touch electrode groups).

FIG. 13 and FIG. 14 illustrate an example in which a touch sensing electrode group (a group of electrodes in a common row line) in which touch sensing is performed is the touch electrode group Gr1, including the electrodes S11, S12, S13, and S14, among the three row-direction touch electrode groups Gr1, Gr2, Gr3.

Referring to FIG. 13, the source driver 120 may apply a touch data signal Vtouch_data to all of the plurality of data lines DL disposed on the panel 110 in order to prevent a parasitic capacitance component Cpara between the common electrodes S11 to S34 and the data lines DL. That is, the touch data signal Vtouch_data are applied to all of the plurality of data lines DL corresponding to the four columnar touch electrode groups Gc1 to Gc4.

In addition, the scanning driver 130 may apply a touch gate signal Vtouch_gate to all of the plurality of gate lines GL disposed on the panel 110 in order prevent a parasitic capacitance component Cpara between the common electrodes S11 to S34 and the gate lines GL. That is, the touch gate signal Vtouch_gate are applied to all of the plurality of gate lines GL corresponding to the four columnar touch electrode groups Gc1 to Gc4.

An application method different from the whole application method (i.e. the method of applying the touch data signal all of the data lines and the touch gate signal to all of the gate lines) in FIG. 13 will be described with reference to FIG. 14. In the touch driving mode, the source driver 120 may apply the touch data signal Vtouch_data to portions of the plurality of data lines DL.

Referring to FIG. 14, when the source driver 120 applies a touch driving signal or a signal corresponding to the touch driving signal to portions of the plurality of data lines DL, a touch data signal Vtouch_data may be applied to at least one data line 1400 corresponding to the touch sensing electrode group Gc2 selected from among the plurality of electrode groups Gc1 to Gc4. This partial application method can significantly reduce power consumption as compared to the whole application method illustrated in FIG. 13.

In addition, referring to FIG. 14, when applying the touch data signal Vtouch_data to at least one data line 1400 corresponding to the touch sensing electrode group Gc2, the source driver 120 may further apply a touch data signal Vtouch_data to data lines 1410 and 1420 corresponding to the electrode groups Gc1 and Gc3 adjacent to the touch sensing electrode group Gc2. This can consequently further improve the accuracy of touch sensing.

As illustrated in FIG. 14, when the source driver 120 applies the touch data signal Vtouch_data to portions of the plurality of data lines DL, the scanning driver 130 can apply a touch gate signal to all of the plurality of gate lines GL.

As illustrated in FIG. 14, when the source driver 120 applies the touch data signal Vtouch_data to portions of the plurality of data lines DL, each of the plurality of electrode groups Gc1 to Gc4 is composed of two or more electrodes disposed in a common column in the first direction (in the column direction) among the plurality of electrodes S11 to S14, S21 to S24, and S31 to S34.

Figure 15:
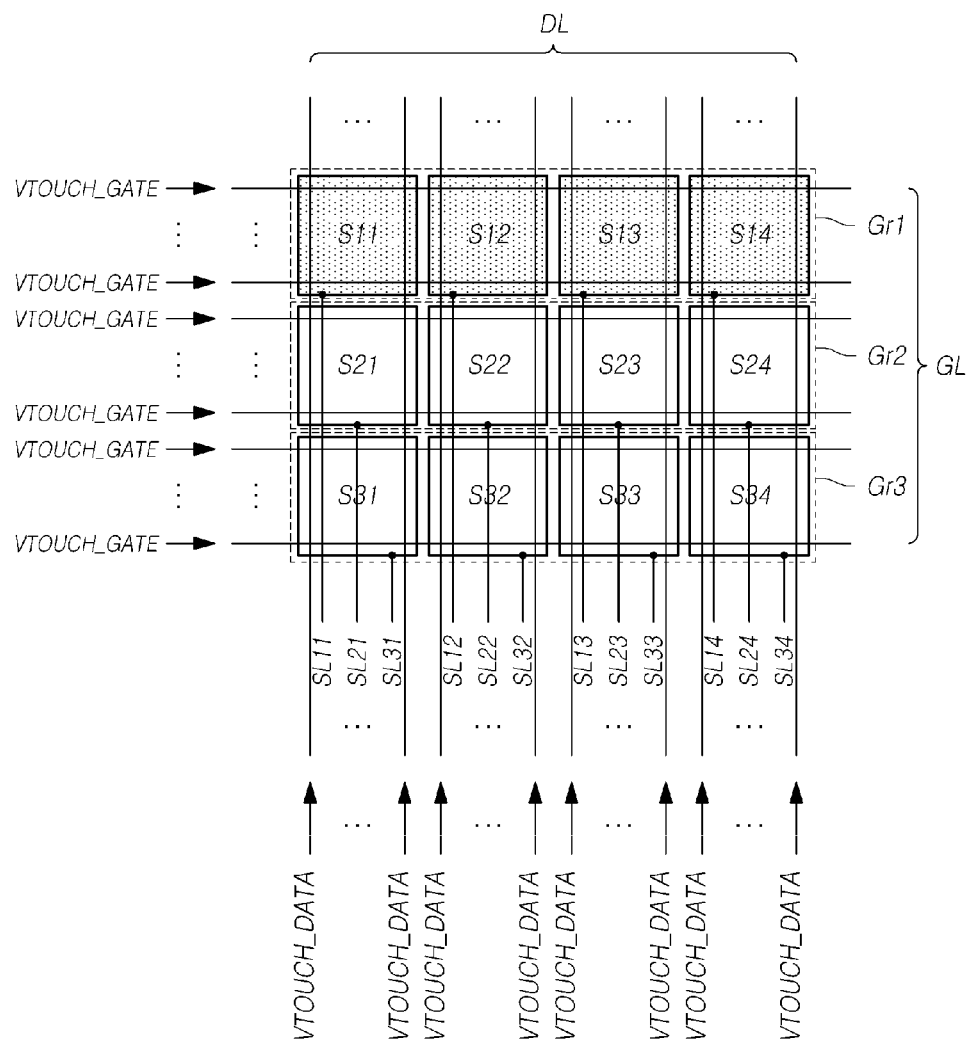
FIG. 15 and FIG. 16 are schematic views illustrating a method of applying touch data signals and touch gate signals to the data lines and the gate lines in the display device having an in-cell touch structure according to the embodiment when touch sensing is performed according to touch electrode rows (row-direction touch electrode groups)
Figure 16:
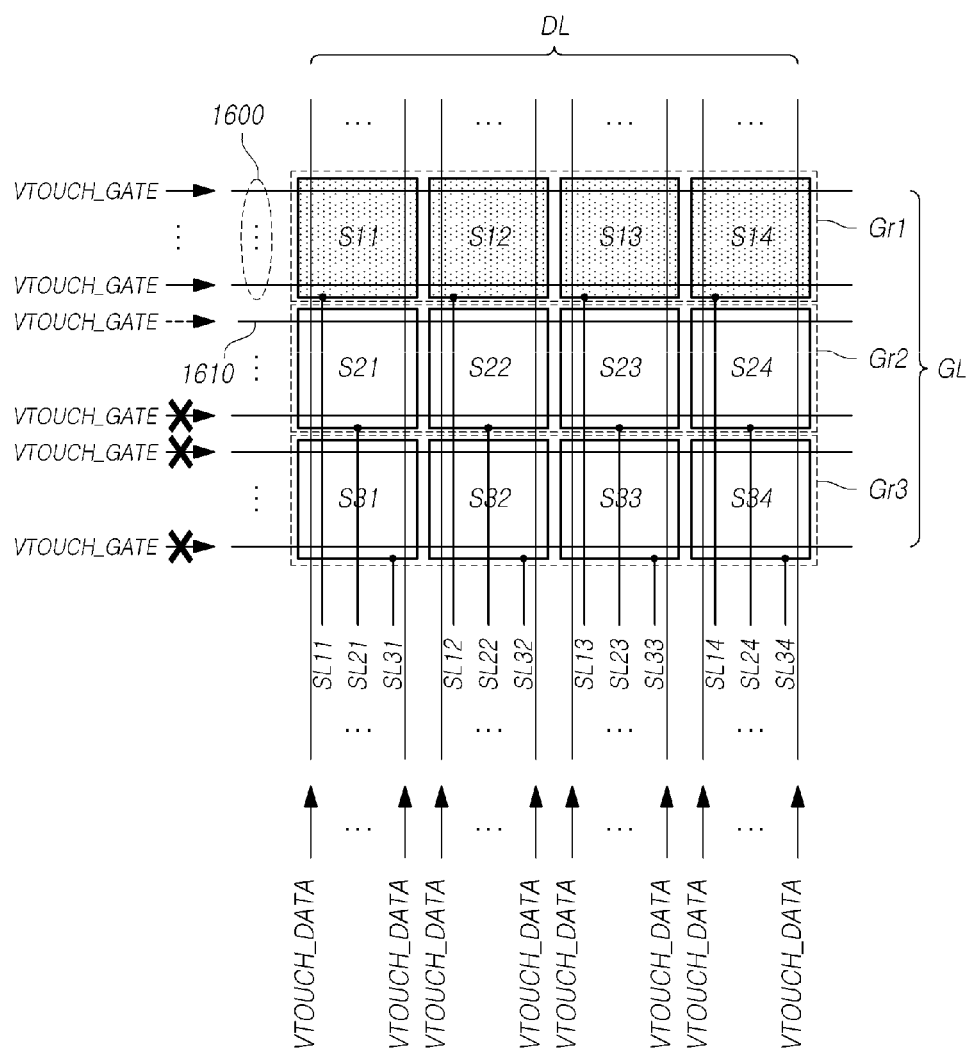

FIG. 15 and FIG. 16 are schematic views illustrating a method of applying a touch data signal Vtouch_data and a touch gate signal Vtouch_gate to the data lines and the gate lines in the display device 100 having an in-cell touch structure according to the embodiment when touch sensing is performed according to the touch electrode rows (row-direction touch electrode groups Gr1, Gr2, and Gr3).

FIG. 15 and FIG. 16 illustrate an example in which a touch sensing electrode group (a group of electrodes in a common row line) in which touch sensing is performed is the touch electrode group Gr1, including the electrodes S11, S12, S13 and S14, among the three row-direction touch electrode groups Gr1 to Gr3. Referring to FIG. 15, the source driver 120 may apply the touch data signal Vtouch_data to all of the plurality of data lines DL disposed on the panel 110 in order to prevent a parasitic capacitance component Cpara between the common electrodes S11 to S34 and the data lines DL. That is, the touch data signal Vtouch_data are applied to all of the plurality of data lines DL corresponding to the three row-direction touch electrode groups Gr1 to Gr3.

In addition, the scanning driver 130 may apply the touch gate signal Vtouch_gate to all of the plurality of gate lines GL disposed on the panel 110 in order to prevent a parasitic capacitance component Cpara between the common electrodes S11 to S34 and the gate lines GL. That is, the touch gate signal Vtouch_gate are applied to all of the plurality of gate lines GL corresponding to the three row-direction touch electrode groups Gr1 to Gr3.

An application method different from the whole application method (i.e. the method of applying the touch data signal all of the data lines and the touch gate signal to all of the gate lines) in FIG. 15 will be described with reference to FIG. 16. In the touch driving mode, the scanning driver 130 may apply the touch gate signal Vtouch_gate to portions of the plurality of gate lines GL.

Referring to FIG. 16, when the scanning driver 130 applies the touch gate signal Vtouch_gate to portions of the plurality of gate lines GL, a touch gate signal Vtouch_gate may be applied to at least one gate line 1600 corresponding to the touch sensing electrode group Gr1 selected from among the plurality of electrode groups Gr1 to Gr3. This partial application method can significantly reduce power consumption than the whole application method illustrated in FIG. 15.

In addition, referring to FIG. 16, when the scanning driver 130 applies the touch gate signal Vtouch_gate to the at least one gate line 1600 corresponding to the touch sensing electrode group Gr1, the scanning driver 130 may further apply a touch gate signal to at least one gate line 1610 corresponding to the electrode group Gr2 adjacent to the touch sensing electrode group Gr1. This can consequently further improve the accuracy of touch sensing.

As illustrated in FIG. 16, when the scanning driver 130 applies the touch gate signal Vtouch_gate to portions of the plurality of gate lines GL, the source driver 120 may apply the touch data signal Vtouch_data to all of the plurality of data lines DL.

In addition, as illustrated in FIG. 16, when the scanning driver 130 applies the touch driving signal or a signal corresponding to the touch driving signal to portions of the plurality of gate lines GL, each of the plurality of electrode groups Gr1 to Gr3 is composed of two or more electrodes disposed in a common row in the second direction (the row direction) among the plurality of electrodes S11 to S14, S21 to S24, and S31 to S34.

Hereinafter, a method of generating signals Vtouch_vcom, Vtouch_data, and Vtouch_gate relating to the touch driving mode and the characteristics of the signals will be described with reference to FIG. 17A to FIG. 24C.

Figure 17A:
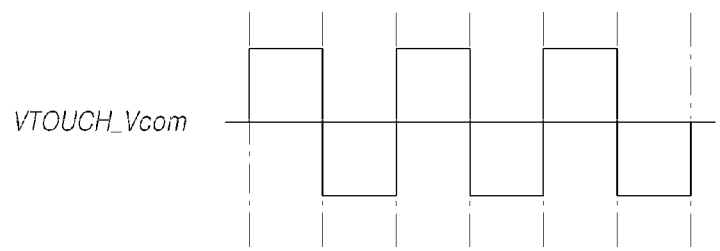
FIG. 17A, FIG. 17B, and FIG. 17C illustrate an exemplary touch driving signal applied to a touch electrode, an exemplary touch data signal applied to a data line, and an exemplary touch gate signal applied to a gate line in the display device having an in-cell touch structure according to the embodiment.
Figure 17B:
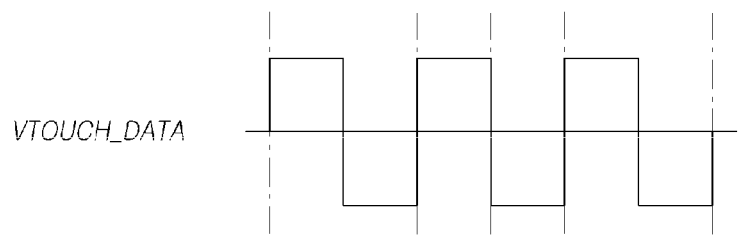
Figure 17C:
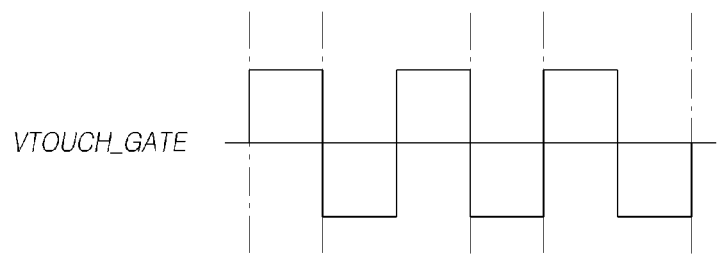

FIG. 17A, FIG. 17B, and FIG. 17C illustrate an exemplary touch driving signal Vtouch_vcom applied to a touch electrode, an exemplary touch data signal Vtouch_data applied to a data line, and a touch gate signal Vtouch_gate applied to a gate line in the display device having an in-cell touch structure according to the embodiment.

As illustrated in FIG. 17A to FIG. 17C, in the touch driving mode, the touch driving signal Vtouch_vcom applied to a common electrode functioning as a touch electrode, the touch data signal Vtouch_data applied to a data line, and the touch gate signal Vtouch_gate applied to a gate line may have the same voltage waveform. That is, at least one selected from among a frequency, a phase, and a voltage value may be the same in the three signals Vtouch_vcom, Vtouch_data, and Vtouch_gate.

Figure 18:
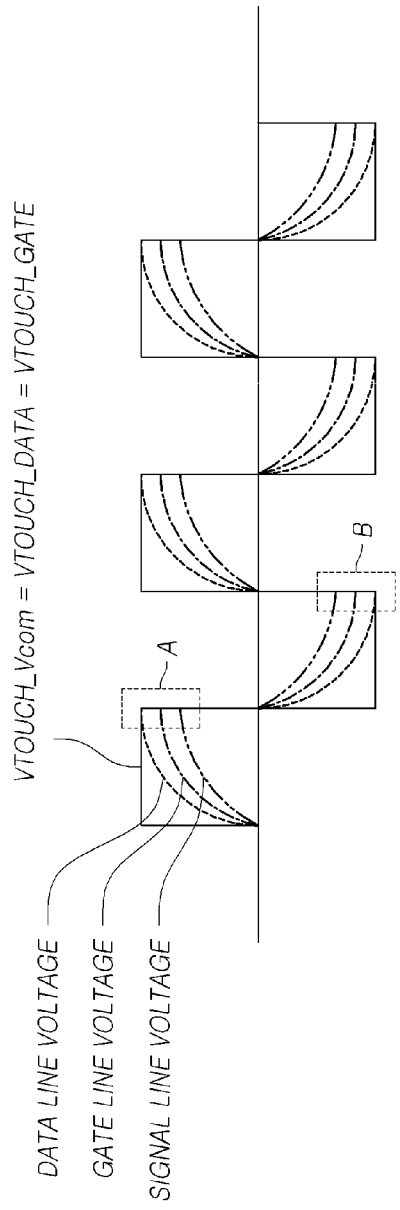
FIG. 18 illustrates voltage waveforms on the touch electrode (common electrode), the data line, and the gate line when the touch driving signal, the touch data signal, and the touch gate signal having the same voltage waveform as in FIG. 17A to FIG. 17C are applied to the touch electrode (common electrode), the data line, and the gate line.

FIG. 18 illustrates voltage waveforms on the touch electrode (common electrode), the data line, and the gate line when the touch driving signal Vtouch_vcom, the touch data signal Vtouch_data, and the touch gate signal Vtouch_gate having the same voltage waveform as in FIG. 17 are applied to the touch electrode (common electrode), the data line, and the gate line.

Each of the touch electrode (common electrode), the data line, and the gate line may have different resistor capacitor (RC) loads depending on the positions thereof. The RC load of the data line may vary depending on the position corresponding to the common line, and the RC load of the gate line may vary depending on the position corresponding to the common electrode.

Thus, even if a touch driving signal Vtouch_vcom, a touch data signal Vtouch_data, and a touch gate signal Vtouch_gate having the same voltage waveform are applied to a touch electrode (common electrode), a data line, and a gate line, a voltage actually formed in each of the touch electrode (common electrode), the data line, and the gate line may have an RC delay depending on the position of each of the touch electrode (common electrode), the data line, and the gate line, as illustrated in FIG. 18.

The case illustrated in FIG. 18 is based on an assumption that a greatest delay occurs when a voltage is formed on the common electrode due to the characteristics of the signal line through which the touch driving signal Vtouch_vcom is applied to the common electrode, and a smallest delay occurs when a voltage is formed on the data line due to the characteristics of the data line through which the touch data signal Vtouch_data is applied.

Thus, as illustrated in FIG. 18, when a touch driving signal Vtouch_vcom is applied to a touch electrode (common electrode) in the touch driving mode, even if a touch data signal Vtouch_data and a touch gate signal Vtouch_gate having the same voltage waveform as the touch driving signal Vtouch_vcom are applied to the data line and the gate line in order to prevent parasitic capacitance, actual voltages formed at point A and point B on each of the touch electrode (common electrode), the data line, and the gate line may differ from each other due to different RC delays. Here, point A is a point in which a signal voltage changes from a higher level to a lower level, and point B is a point in which the signal voltage changes from the lower level to the higher level.

In addition, in the case illustrated in FIG. 18, at points in time (point A and point B) in which the signal voltage level of each of the touch driving signal Vtouch_vcom, the touch data signal Vtouch_data, and the touch gate signal Vtouch_gate changes, each of actual voltages formed on the touch electrode (common electrode) and the gate line fails to reach intended levels.

Here, the intended voltage levels are the voltage levels of each of the touch driving signal Vtouch_vcom, the touch data signal Vtouch_data, and the touch gate signal Vtouch_gate at the points in time (point A and point B) in which the signal voltage level of each of the touch driving signal Vtouch_vcom, the touch data signal Vtouch_data, and the touch gate signal Vtouch_gate changes.

Due to these features, a parasitic capacitor between a common electrode and a data line and/or a parasitic capacitor between a common electrode and a gate line may not be removed.

This is because there are variations in the RC load depending on the length of a position to which the touch driving signal Vtouch_vcom, the touch data signal Vtouch_data, and the touch gate signal Vtouch_gate are applied.

Such variations in the RC load occur among the common electrode, the data line, and the gate line, between the common electrodes, between different positions on the data line, and between different positions on the gate line.

Hereinafter, variations in the RC load occurring due to differences in the length between paths along which touch driving signal Vtouch_vcom are applied, variations in the RC load occurring at points in which a touch data signal Vtouch_data is applied due to differences in the position between the points, and variations in the RC load occurring at points to which a touch gate signal Vtouch_gate is applied due to differences in the position between the points will be described with reference to FIG. 19A, FIG. 19B, and FIG. 19C.

Figure 19A:
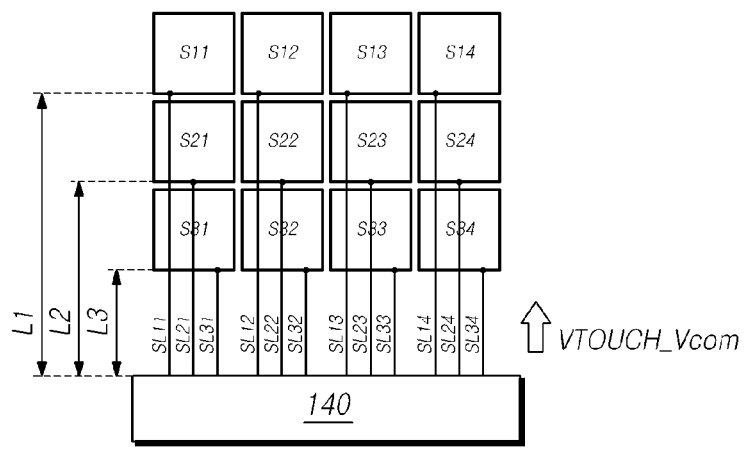
FIG. 19A, FIG. 19B, and FIG. 19C illustrate variations in an RC load depending on the position of the panel in the display device having an in-cell touch structure according to the embodiment.
Figure 19B:
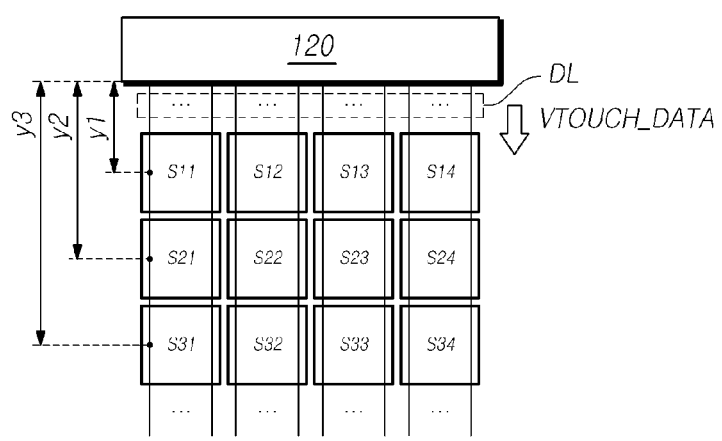
Figure 19C:
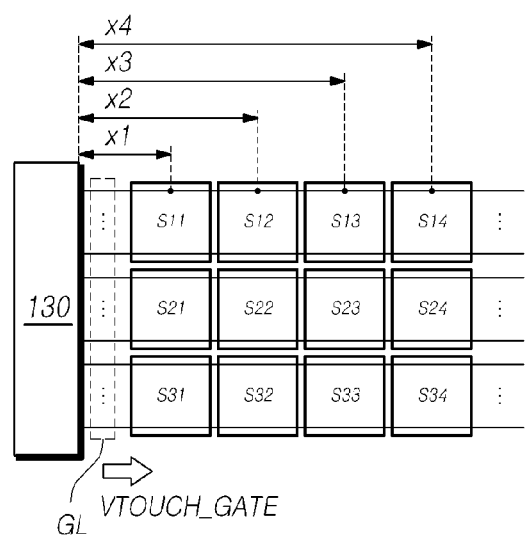

FIG. 19A, FIG. 19B, and FIG. 19C illustrate variations in the RC load depending on the position of the panel in the display device 100 having an in-cell touch structure according to the embodiment.

Referring to FIG. 19A, the common electrodes S11, S12, S13, and S14 disposed on the first row are connected to the touch circuit 140 via the signal lines SL11, SL12, SL13, and SL14 each having a length L1, the common electrodes S21, S22, S23, and S24 disposed on the second row are connected to the touch circuit 140 via the signal lines SL21, SL22, SL23, and SL24 each having a length L2, and the common electrodes S31, S32, S33, and S34 disposed on the third row are connected to the touch circuit 140 via the signal lines SL31, SL32, SL33, and SL34 each having a length L3. Each of the signal lines SL11, SL12, SL13, and SL14 having the length L1 has the greatest RC delay, whereas each of the signal lines SL31, SL32, SL33, and SL34 having the length L3 has the smallest RC delay.

Referring to FIG. 19A, since L1>L2>L3, the common electrodes S11, S12, S13, and S14 on the first row are positioned most remotely from the touch circuit 140, by which the touch driving signal Vtouch_vcom are applied thereto, and the common electrodes S31, S32, S33, and S34 on the third row are positioned closest to the touch circuit 140, by which the touch driving signal Vtouch_vcom are applied thereto.

Thus, a voltage on each of the common electrodes S11, S12, S13, and S14 disposed on the first row has a greatest difference from a voltage on each of the common electrodes S31, S32, S33, and S34 disposed on the third row, at the points in which the voltage of the touch driving signal Vtouch_vcom changes between higher and lower levels. If the voltage at a position on the data lines and/or the gate lines corresponding to the common electrodes S11, S12, S13, and S14 disposed on the first row is the same as the voltage of the touch driving signal Vtouch_vcom, a parasitic capacitor is formed between the data lines and the common electrodes and/or between the gate lines and the common electrodes instead of being removed therefrom.

On the other hand, the voltage formed on each of the common electrodes S11, S12, S13, and S14 disposed on the first row may be the last to reach the same as the voltage of the touch driving signal Vtouch_vcom.

Referring to FIG. 19B, on a single data line, a position corresponding to each of the common electrodes S11, S12, S13, and S14 disposed on the first row, a position corresponding to each of the common electrodes S21, S22, S23, and S24 disposed on the second row, and a position corresponding to each of the common electrodes S31, S32, S33, and S34 disposed on the third row are spaced apart from the source driver 120 at different distances.

That is, the distance from the position on the single data line corresponding to each of the common electrodes S11, S12, S13, and S14 disposed on the first row to the source driver 120 is y1, the distance from the position on the single data line corresponding to each of the common electrodes S21, S22, S23, and S24 disposed on the second row to the source driver 120 is y2, and the distance from the position on the single data line corresponding to each of the common electrodes S31, S32, S33, and S34 disposed on the third row to the source driver 120 is y3.

Since y3>y2>y1, a voltage formed at the position on the data line corresponding to each of the common electrodes S31, S32, S33, and S34 disposed on the third row has a greatest difference from the voltage of the touch data signal Vtouch_data at point A and point B in which the signal voltage level of the touch data signal Vtouch_data changes between the higher level and the lower level. If the voltage of each of the common electrodes S31, S32, S33, and S34 disposed on the third row is equal to the voltage of the touch data signal Vtouch_data, a parasitic capacitor is formed between the data line and each of the common electrodes instead of being removed therefrom.

On the other hand, the voltage formed on each of the data lines corresponding to the common electrodes S31, S32, S33, and S34 disposed on the third row may be the last to reach the same as the voltage of the touch data signal Vtouch_data.

Referring to FIG. 19C, on a single gate line, a position corresponding to each of the common electrodes S11, S21, and S31 disposed on the first column, a position corresponding to each of the common electrodes S12, S22, and S32 disposed on the second column, a position corresponding to each of the common electrodes S13, S23, and S33 disposed on the third column, and a position corresponding to each of the common electrodes S14, S24, and S34 disposed on the fourth column are spaced apart from the scanning driver 130 at different distances.

That is, the distance from the position corresponding to each of the common electrodes S11, S21, and S31 disposed on the first column to the scanning driver 130 is x1, the distance from the position corresponding to each of the common S12, S22, and S32 disposed on the second column to the scanning driver 130 is x2, the distance from the position corresponding to each of the common electrodes S13, S23, and S33 disposed on the third column to the scanning driver 130 is x3, and the distance from the position corresponding to each of the common electrodes S14, S24, and S34 disposed on the fourth column to the scanning driver 130 is x4.

Since x4>x3>x2>x1, a voltage formed at the position on the gate line corresponding to each of the common electrodes S14, S24, and S34 disposed on the fourth column has a greatest difference from the voltage of the touch gate signal Vtouch_gate at point A and point B in which the signal voltage level of the touch data signal Vtouch_data changes between the higher level and the lower level. If the voltage of each of the common electrodes S14, S24, and S34 disposed on the fourth column is equal to the voltage of the touch gate signal Vtouch_gate, a parasitic capacitor is formed between the gate line and each of the common electrodes instead of being removed therefrom.

On the other hand, the voltage formed on each of the gate lines corresponding to the common electrodes S14, S24, and S34 disposed on the fourth column may be the last to reach the same as the voltage of the touch gate signal Vtouch_gate.

As described above, the parasitic capacitor may not be removed due to variations in the RC load among the common electrodes, the data lines, and the gate lines, variations in the RC load between the common electrodes, variations in the RC load between different positions on the data line, or variations in the RC load between different positions on the gate line. In order to overcome this problem, proposed is a method of varying a signal waveform such that the voltage waveform of at least one of the touch driving signal Vtouch_vcom, the touch data signal Vtouch_data, and the touch gate signal Vtouch_gate differs from that of the other signal(s) instead of imparting the same voltage waveform to all of the touch driving signal Vtouch_vcom, the touch data signal Vtouch_data, and the touch gate signal Vtouch_gate. In addition, a new signal form is also proposed in order to overcome the above-described problem.

Hereinafter, the method of varying a signal waveform and the new signal form will be described with reference to FIG. 20A to FIG. 24C.

Figure 20A:
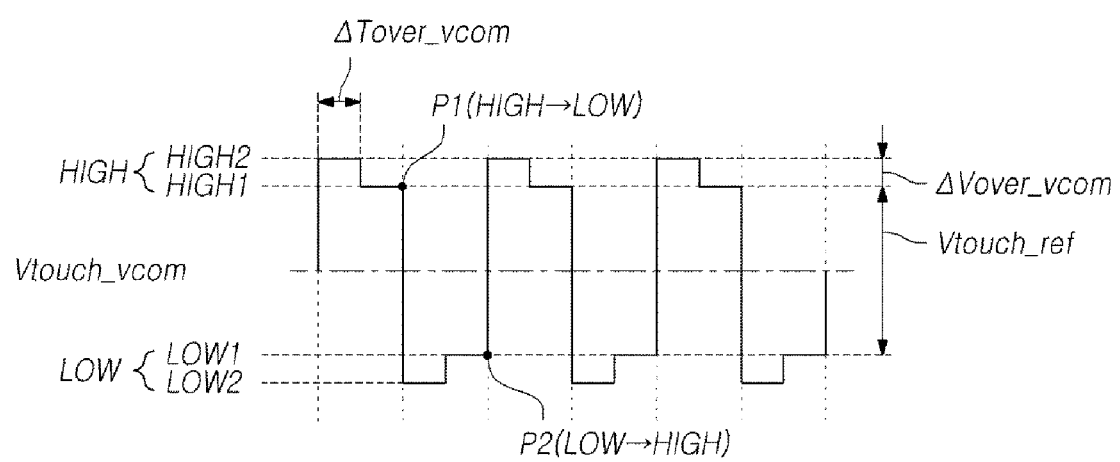
FIG. 20A, FIG. 20B, and FIG. 20C illustrate another exemplary touch driving signal applied to a touch electrode, another exemplary touch data signal applied to a data line, and another exemplary touch gate signal applied to a gate line in the display device having an in-cell touch structure according to the embodiment.
Figure 20B:
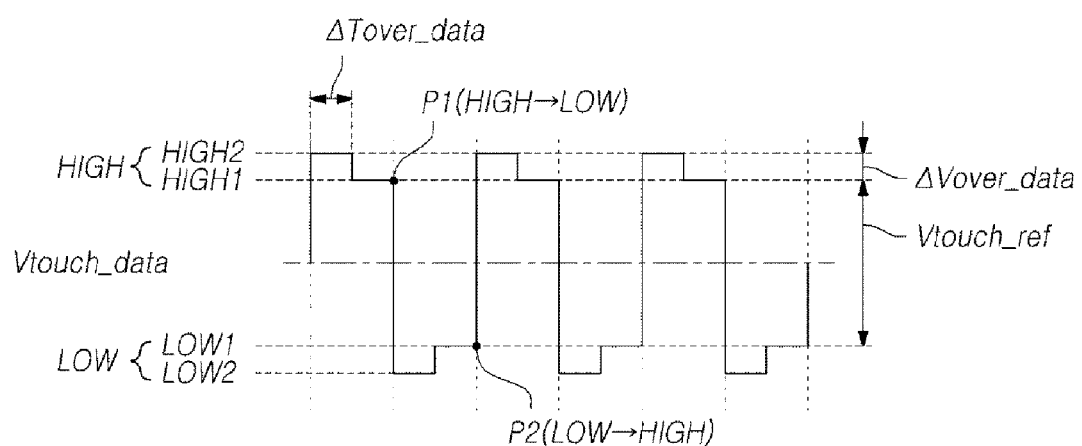
Figure 20C:
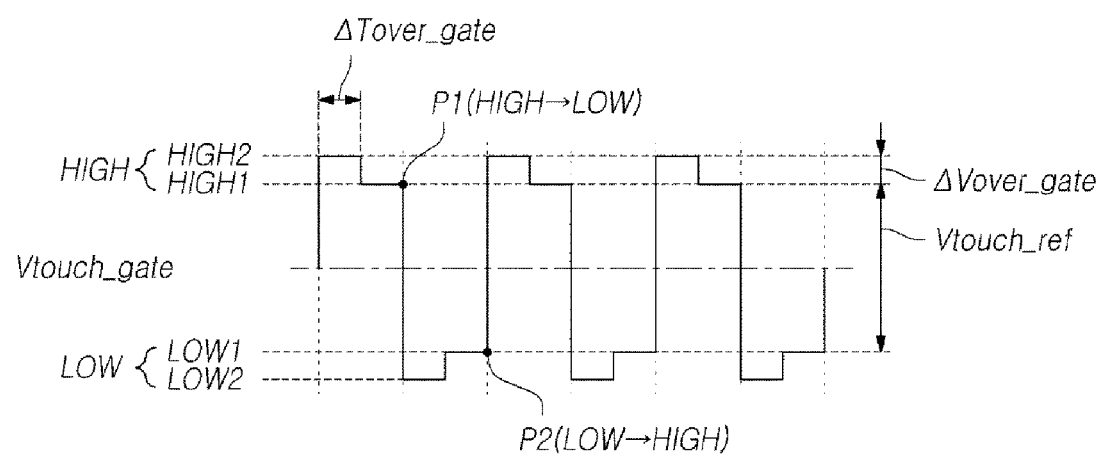

FIG. 20A, FIG. 20B, and FIG. 20C illustrate another exemplary touch driving signal Vtouch_vcom applied to a touch electrode, another exemplary touch data signal Vtouch_data applied to a data line, and another exemplary touch gate signal Vtouch_gate applied to a gate line in the display device 100 having an in-cell touch structure according to the embodiment.

FIG. 20A illustrates a signal voltage waveform of the touch driving signal Vtouch_vcom applied to a common electrode functioning as the touch electrode, FIG. 20B illustrates a signal voltage waveform of the touch data signal Vtouch_data applied to the data line, and FIG. 20C illustrates a signal voltage waveform of the touch gate signal Vtouch_gate applied to the gate line.

As illustrated in FIG. 20A to FIG. 20C, each of the touch driving signal Vtouch_vcom, the touch data signal Vtouch_data, and the touch gate signal Vtouch_gate alternates between a high level and a low level.

Referring to FIG. 20A to FIG. 20C, at least one of the touch driving signal Vtouch_vcom, touch data signal Vtouch_data, and the touch gate signal Vtouch_gate may have two different higher voltage levels HIGH1 and HIGH2 and two different lower voltage levels LOW1 and LOW2.

Referring to the waveform of the touch driving signal Vtouch_vcom illustrated in FIG. 20A, the amplitude thereof is greater than a touch reference voltage (i.e., a reference waveform) Vtouch_ref by two times a touch electrode overdrive voltage (i.e., overdrive amplitude) ΔVover_vcom for a period of touch electrode overdrive (i.e., overdrive duration) ΔTover_vcom.

The period of touch electrode overdrive ΔTover_vcom is previously set to a value equal to or greater than zero (0).

The touch electrode overdrive voltage ΔVover_vcom is set to a value equal to or greater than 0.

The touch electrode overdrive voltage ΔVover_vcom determines the number of higher levels HIGH and the number of lower levels LOW of the touch driving signal Vtouch_vcom.

When the touch electrode overdrive voltage ΔVover_vcom is set to 0, both the number of the higher levels HIGH and the number of the lower levels LOW become one (1). In this case, the waveform of the touch driving signal Vtouch_vcom is the same as that illustrated in FIG. 17A.

When the touch electrode overdrive voltage ΔVover_vcom is set to a voltage value greater than 0, both the number of the higher levels HIGH and the number of the lower levels LOW become 2.

Referring to the waveform of the touch data signal Vtouch_data illustrated in FIG. 20B, the amplitude thereof is greater than a touch reference voltage (i.e., reference waveform) Vtouch_ref by two times a data line overdrive voltage (i.e., overdrive amplitude) ΔVover_data for a period of data line overdrive (i.e., overdrive duration) ΔTover_data.

The period of data line overdrive ΔTover_data is set to a time value equal to or greater than 0.

The data line overdrive voltage ΔVover_data is set to a voltage value equal to or greater than 0.

The data line overdrive voltage ΔVover_data determines the number of higher levels HIGH and the number of lower levels LOW of the touch data signal Vtouch_data.

When the data line overdrive voltage ΔVover_data is set to 0, both the number of the higher levels HIGH and the number of the lower levels LOW become 1. In this case, the waveform of the touch data signal Vtouch_data is the same as that illustrated in FIG. 17B.

When the data line overdrive voltage ΔVover_data is set to a voltage value greater than 0, both the number of the higher levels HIGH and the number of the lower levels LOW become 2.

Referring to the waveform of the touch gate signal Vtouch_gate illustrated in FIG. 20C, the amplitude thereof is greater than a touch reference voltage (i.e., reference waveform) Vtouch_ref by two times a gate line overdrive voltage (i.e., overdrive amplitude) ΔVover_gate for a period of gate line overdrive (i.e., overdrive duration) ΔTover_gate.

The period of gate line overdrive ΔTover_gate is set to a time value equal to or greater than 0.

The gate line overdrive voltage ΔVover_gate is set to a voltage value equal to or greater than 0.

The gate line overdrive voltage ΔVover_gate determines the number of higher levels HIGH and the number of lower levels LOW of the touch gate signal Vtouch_gate.

When the gate line overdrive voltage ΔVover_gate is set to 0, both the number of the higher levels HIGH and the number of the lower levels become 1. In this case, the waveform of the touch gate signal Vtouch_gate is the same as that illustrated in FIG. 17C.

When the gate line overdrive voltage ΔVover_gate is set to a voltage value that is greater than 0, both the number of the higher levels HIGH and the number of the lower levels LOW become 2.

The period of touch electrode overdrive ΔTover_vcom of the touch driving signal Vtouch_vcom, the period of data line overdrive ΔTover_data of the touch data signal Vtouch_data, and the period of gate line overdrive ΔTover_gate of the touch gate signal Vtouch_gate may be set separately.

Each of the period of touch electrode overdrive ΔTover_vcom of the touch driving signal Vtouch_vcom, the period of data line overdrive ΔTover_data of the touch data signal Vtouch_data, and the period of gate line overdrive ΔTover_gate of the touch gate signal Vtouch_gate may be set to a time value equal to or greater than 0 such that all of the voltage of the electrode to which the touch driving signal Vtouch_vcom is applied, the voltage of the data line to which the touch data signal Vtouch_data is applied, and the voltage of the gate line to which the touch gate signal Vtouch_gate is applied become equal at points in time (point P1 (HIGH->LOW) and point P2 (LOW->HIGH)) in which the voltage of each of the touch driving signal Vtouch_vcom, the touch data signal Vtouch_data, and the touch gate signal Vtouch_gate is changed to the lower level LOW or the higher level HIGH.

For example, the slower the rising rate of the voltage of a worst common electrode is, the longer the period of touch electrode overdrive ΔTover_vcom becomes, thereby obtaining an increased period of time for which the voltage of the worst common electrode can rise to intended voltage levels. The worst common electrode refers to the electrode having a greatest RC delay among the electrodes (common electrodes) to which the touch driving signal Vtouch_vcom is applied. At the intended voltage levels, the voltage of the worst common electrode may become equal to the voltage of the data line to which the touch data signal Vtouch_data is applied and the voltage of the gate line to which the touch gate signal Vtouch_gate is applied, corresponding to the touch reference voltage Vtouch_ref (the voltage level at point P1 and the voltage level at point P2).

For example, the slower the rising rate of the voltage of a worst data line point is, the longer the period of data line overdrive ΔTover_data becomes, thereby obtaining an increased period of time for which the voltage of the worst data line point can rise to intended voltage levels. The worst data line point refers to the point having a greatest RC delay among the points on the data line to which the touch data signal Vtouch_data is applied. At the intended voltage levels, the voltage of the worst data line point may become equal to the voltage of the electrodes to which the touch driving signal Vtouch_vcom is applied and the voltage of the gate line to which the touch gate signal Vtouch_gate is applied, corresponding to the touch reference voltage Vtouch_ref (the voltage level at point P1 and the voltage level at point P2).

For example, the slower the rising rate of the voltage of a worst gate line point is, the longer the period of gate line overdrive ΔTover_gate becomes, thereby obtaining an increased period of time for which the voltage of the worst gate line point can rise to intended voltage levels. The worst gate line point refers to the point having a greatest RC delay among the points on the gate line to which the touch gate signal Vtouch_gate is applied. At the intended voltage levels, the voltage of the worst gate line point may become equal to the voltage of the electrodes to which the touch driving signal Vtouch_vcom is applied and the voltage of the data line to which the touch data signal Vtouch_data is applied, corresponding to the touch reference voltage Vtouch_ref (the voltage level at point P1 and the voltage level at point P2).

The touch electrode overdrive voltage ΔVover_vcom of the touch driving signal Vtouch_vcom, the data line overdrive voltage ΔVover_data of the touch data signal Vtouch_data, and the gate line overdrive voltage ΔVover_gate of the touch gate signal Vtouch_gate may be set separately.

Each of the touch electrode overdrive voltage ΔVover_vcom of the touch driving signal Vtouch_vcom, the data line overdrive voltage ΔVover_data of the touch data signal Vtouch_data, and the gate line overdrive voltage ΔVover_gate of the touch gate signal Vtouch_gate may be set to a voltage value equal to or greater than 0 such that all of the voltage of the electrode to which the touch driving signal Vtouch_vcom is applied, the voltage of the data line to which the touch data signal Vtouch_data is applied, and the voltage of the gate line to which the touch gate signal Vtouch_gate is applied become equal at points in time (point P1 (HIGH->LOW) and point P2 (LOW->HIGH)) in which the voltage of each of the touch driving signal Vtouch_vcom, the touch data signal Vtouch_data, and the touch gate signal Vtouch_gate is changed to the higher level HIGH or the lower level LOW.

For example, the slower the rising rate of the voltage of a worst common electrode is, the greater the touch electrode overdrive voltage ΔVover_vcom becomes, thereby obtaining an increased voltage potential with which the voltage of the worst common electrode can rise to intended voltage levels. The worst common electrode refers to the electrode having the greatest RC delay among the electrodes (common electrodes) to which the touch driving signal Vtouch_vcom is applied. At the intended voltage levels, the voltage of the worst common electrode may become equal to the voltage of the data line to which the touch data signal Vtouch_data is applied and the voltage of the gate line to which the touch gate signal Vtouch_gate is applied, corresponding to the touch reference voltage Vtouch_ref (the voltage level at point P1 and the voltage level at point P2).

For example, the slower the rising rate of the voltage of a worst data line point is, the greater the data line overdrive voltage ΔVover_data becomes, thereby obtaining an increased voltage potential with which the voltage of the worst data line point can rise to intended voltage levels. The worst data line point refers to the point having the greatest RC delay among the points on the data line to which the touch data signal Vtouch_data is applied. At the intended voltage levels, the voltage of the worst data line point may become equal to the voltage of the electrodes to which the touch driving signal Vtouch_vcom is applied and the voltage of the gate line to which the touch gate signal Vtouch_gate is applied, corresponding to the touch reference voltage Vtouch_ref (the voltage level at point P1 and the voltage level at point P2).

For example, the slower the rising rate of the voltage of a worst gate line point is, the greater the gate line overdrive voltage ΔVover_gate becomes, thereby obtaining an increased voltage potential with which the voltage of the worst gate line point can rise to intended voltage levels. The worst gate line point refers to the point having the greatest RC delay among the points on the gate line to which the touch gate signal Vtouch_gate is applied. At the intended voltage levels, the voltage of the worst gate line point may become equal to the voltage of the electrodes to which the touch driving signal Vtouch_vcom is applied and the voltage of the data lines to which the touch data signal Vtouch_data is applied, corresponding to the touch reference voltage Vtouch_ref (the voltage level at point P1 and the voltage level at point P2).

The signal waveforms illustrated in FIG. 20A to FIG. 20C become identical to the signal waveforms illustrated in FIG. 17A to FIG. 17C when ΔVover_vcom=0, ΔVover_data=0, and ΔVover_data=0. That is, the waveforms illustrated in FIG. 17A to FIG. 17C correspond to specific cases of the waveforms illustrated in FIG. 20A to FIG. 20C, where ΔVover_vcom=0, ΔVover_data=0, and ΔVover_data=0.

Referring to FIG. 20A to FIG. 20C, the touch driving signal Vtouch_vcom applied to the touch electrode may be considered as having an overdriven signal waveform. The level of overdrive may be determined by the voltage difference HIGH2-HIGH1 between the two higher levels HIGH1 and HIGH2 and the voltage difference LOW2-LOW1 between the two lower levels LOW1 and LOW2.

Like the touch driving signal Vtouch_vcom, each of the touch data signal Vtouch_data and the touch gate signal Vtouch_gate may be considered as having an overdriven signal waveform.

Figure 21A:
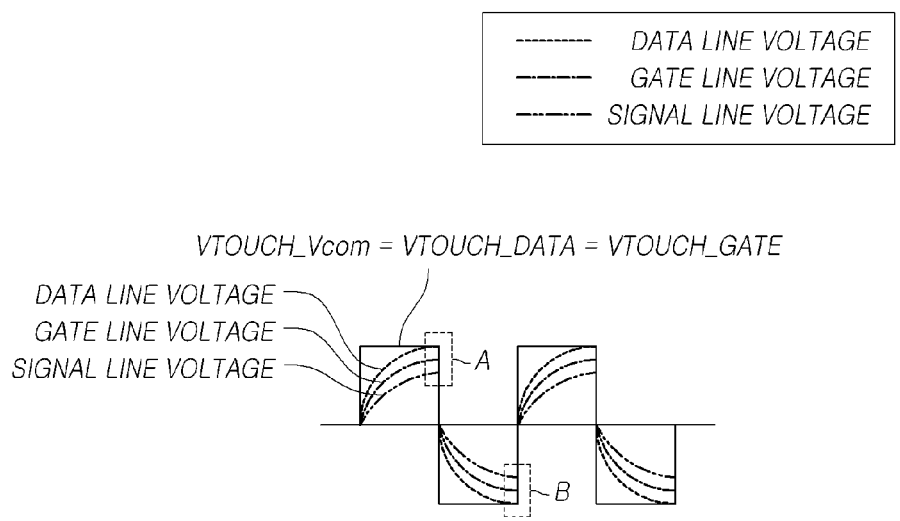
FIG. 21A, FIG. 21B, and FIG. 21C illustrate changes in the voltage waveform on the touch electrode to which the touch driving signal is applied, the data line to which the touch data signal is applied, and the gate line to which the touch gate signal is applied when the signal waveforms illustrated in FIG. 17A to FIG. 17C are replaced with the signal waveforms illustrated in FIG. 20A to FIG. 20C.
Figure 21B:
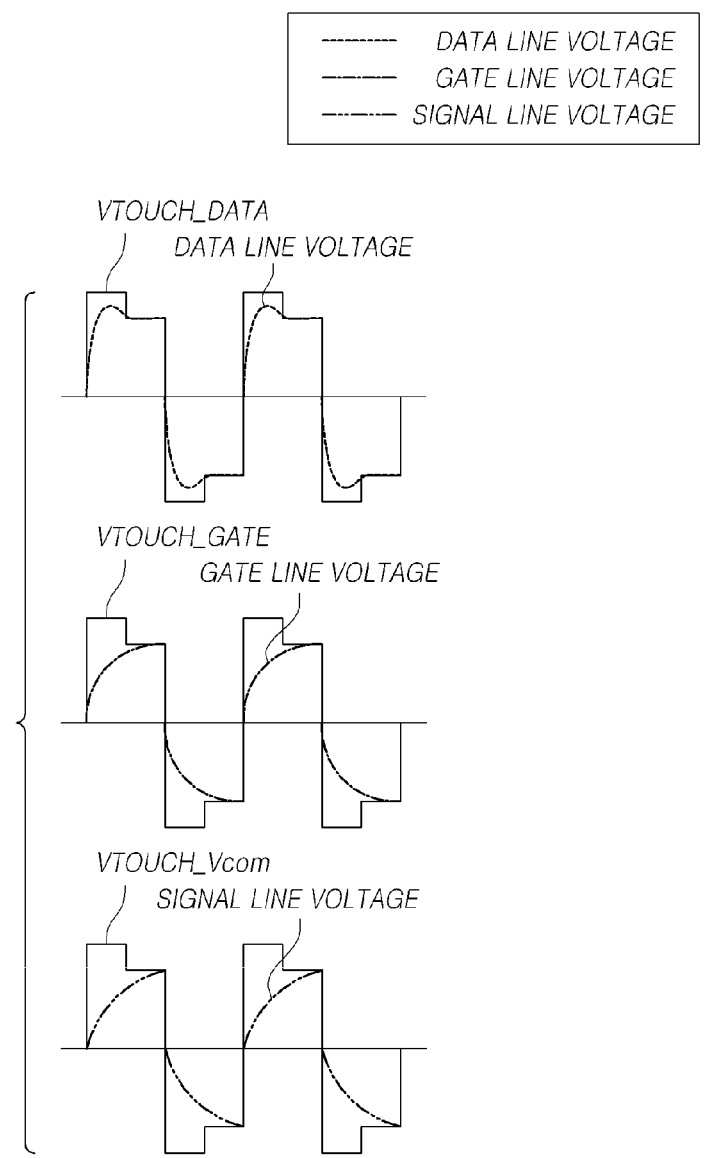
Figure 21C:
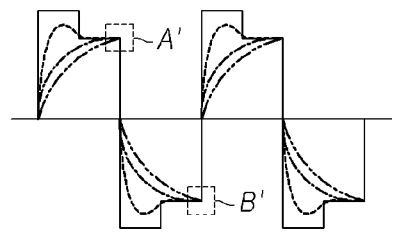

FIG. 21A, FIG. 21B, and FIG. 21C illustrate changes in the voltage waveform on the touch electrode to which the touch driving signal Vtouch_vcom is applied, the data line to which the touch data signal Vtouch_data is applied, and the gate line to which the touch gate signal Vtouch_gate is applied when the signal waveforms illustrated in FIG. 17A to FIG. 17C are replaced with the signal waveforms illustrated in FIG. 20A to FIG. 20C.

Here, it is assumed that the sizes of the RC delays (RC loads) of the worst touch electrode having the greatest RC delay among the touch electrodes (common electrodes), the worst data line point having the greatest RC delay among the points on the data line, and the worst gate line point having the greatest RC delay among the points on the gate line be in the order of the worst touch electrode, the worst gate line point, and the worst data line point.

FIG. 21A illustrates actual voltages formed on the touch electrode (common electrode), the data line, and the gate line when the touch driving signal Vtouch_vcom, the touch data signal Vtouch_data, and the touch gate signal Vtouch_gate having the same voltage waveform (the signal waveforms illustrated in FIG. 17A to FIG. 17C) are applied to the touch electrode (common electrode), the data line, and the gate line.

Referring to FIG. 21A, at points in time (point A and point B) in which the signal voltage level of each of the touch driving signal Vtouch_vcom, the touch data signal Vtouch_data, and the touch gate signal Vtouch_gate changes, actual voltages formed on the touch electrode (common electrode), the data line, and the gate line are different from each other. In addition, each of the actual voltages formed on the touch electrode (common electrode) and the gate line fails to reach intended levels.

The intended levels are the voltage levels of each of the touch driving signal Vtouch_vcom, the touch data signal Vtouch_data, and the touch gate signal Vtouch_gate at points in time (point A and point B) in which the signal voltage level of each of the touch driving signal Vtouch_vcom, the touch data signal Vtouch_data, and the touch gate signal Vtouch_gate changes.

Referring to FIG. 21B, when the signal waveform of the touch driving signal Vtouch_vcom is changed into the waveform in FIG. 20A, at points in time (point P1 and point P2 in FIG. 20A) in which the signal voltage level of the touch driving signal Vtouch_vcom changes, an actual voltage formed on the worst touch electrode (worst common electrode) having the greatest RC delay can reach the intended levels. Here, the intended levels are the voltage levels of the touch driving signal Vtouch_vcom at points in time (point P1 and point P2 in FIG. 20A) in which the signal voltage level of the touch driving signal Vtouch_vcom changes, i.e. the voltage levels HIGH1 and LOW1 corresponding to the touch reference voltage Vtouch_ref.

Referring to FIG. 21B, when the signal waveform of the touch data signal Vtouch_data is changed into the waveform in FIG. 20B, at points in time (point P1 and point P2 in FIG. 20B) in which the signal voltage level of the touch data signal Vtouch_data changes, an actual voltage formed on the worst data line point having the greatest RC delay can reach the intended levels. Here, the intended levels are the voltage levels of the touch data signal Vtouch_data at points in time (point P1 and point P2 in FIG. 20B) in which the signal voltage level of the touch data signal Vtouch_data changes, i.e. the voltage levels HIGH1 and LOW1 corresponding to the touch reference voltage Vtouch_ref.

Referring to FIG. 21B, when the signal waveform of the touch gate signal Vtouch_gate is changed into the waveform in FIG. 20C, at points in time (point P1 and point P2 in FIG. 20C) in which the signal voltage level of the touch gate signal Vtouch_gate changes, an actual voltage formed on the worst gate line point having the greatest RC delay can reach the intended levels. Here, the intended levels are the voltage levels of the touch gate signal Vtouch_gate at points in time (point P1 and point P2 in FIG. 20C) in which the signal voltage level of the touch gate signal Vtouch_gate changes, i.e. the voltage levels HIGH1 and LOW1 corresponding to the touch reference voltage Vtouch_ref.

Referring to FIG. 21A to FIG. 21C, at a point in time (point P1 in FIG. 20A to FIG. 20C, i.e. point A' in FIG. 21C) in which the signal voltage level of each of the touch driving signal Vtouch_vcom, the touch data signal Vtouch_data, and the touch gate signal Vtouch_gate changes from the higher level HIGH to the lower level LOW and a point in time (point P2 in FIG. 20A to FIG. 20C, i.e. point B' in FIG. 21C) in which the signal voltage level thereof changes from the lower level LOW to the higher level HIGH, an amount of time is required for all of the voltage of the touch electrode (common electrode) to which the touch driving signal Vtouch_vcom is applied, the voltage of the data line to which the touch data signal Vtouch_data is applied, and the voltage of the gate line to which the touch gate signal Vtouch_gate is applied to become the same. Here, a different amount of time may be required for at least one among the electrodes to which the touch driving signal Vtouch_vcom is applied, the data line to which the touch data signal Vtouch_data is applied, and the two or more gate lines to which the touch gate signal Vtouch_gate is applied.

That is, the RC delay (RC load) may vary depending on the positions of the touch electrodes (common electrodes S11 to S34), the data lines and points thereon, the gate lines and points thereon.

Describing in greater detail, referring to FIG. 21B, at the point in time (point P1 in FIG. 20A, i.e. point A' in FIG. 21C) in which the signal voltage level of the touch driving signal Vtouch_vcom changes from the higher level HIGH to the lower level and the point in time (point P2 in FIG. 20A, i.e. point B' in FIG. 21C) in which the signal voltage level thereof changes from the lower level LOW to the higher level HIGH, an amount of time (corresponding to an RC delay) is required for all of the voltages of the electrodes to which the touch driving signal Vtouch_vcom is applied to become the same. Here, a different amount of time may be required for at least one electrode, among the electrodes to which the touch driving signal Vtouch_vcom is applied, to have the same voltage.

At the point in time (point P1 in FIG. 20A, i.e. point A' in FIG. 21C) in which the signal voltage level of the touch driving signal Vtouch_vcom changes from the higher level HIGH to the lower level LOW and the point in time (point P2 in FIG. 20A, i.e. point B' in FIG. 21C) in which the signal voltage level thereof changes from the lower level LOW to the higher level HIGH, when an amount of time (corresponding to the RC delay) is required for all of the voltages formed on the electrodes to which the touch driving signal Vtouch_vcom is applied to become the same, a greater amount time may be required for the electrode positioned more remotely from the touch circuit 140 than the electrode positioned closer to the touch circuit 140.

In addition, referring to FIG. 21B, at the point in time (point P1 in FIG. 20B, i.e. point A' in FIG. 21C) in which the signal voltage level of the touch data signal Vtouch_data changes from the higher level HIGH to the lower level LOW and the point in time (point P2 in FIG. 20B, i.e. point B' in FIG. 21C) in which the signal voltage level thereof changes from the lower level LOW to the higher level HIGH, an amount of time (corresponding to an RC delay) is required for all of the voltages formed on the data line and the points thereon to which the touch data signal Vtouch_data is applied to become the same. Here, a different amount of time may be required for at least one point on the data line, among the points on the data line to which the touch data signal Vtouch_data is applied, to have the same voltage.

At the point in time (point P1 in FIG. 20B, i.e. point A' in FIG. 21C) in which the signal voltage level of the touch data signal Vtouch_data changes from the higher level HIGH to the lower level LOW and the point in time (point P2 in FIG. 20B, i.e. point B' in FIG. 21C) in which the signal voltage level thereof changes from the lower level LOW to the higher level HIGH, when an amount of time (corresponding to the RC delay) is required for all of the voltages formed on the data line and the points thereon to which the touch data signal Vtouch_data is applied to become the same, a greater amount of time may be required for the point on the data line positioned more remotely from the source driver 120 than the point positioned closer to the source driver 120.

In addition, referring to FIG. 21B, at the point in time (point P1 in FIG. 20C, i.e. point A' in FIG. 21C) in which the signal voltage level of the touch gate signal Vtouch_gate changes from the higher level HIGH to the lower level LOW and the point in time (point P2 in FIG. 20C, i.e. point B' in FIG. 21C), an amount of time (corresponding to an RC delay) is required for all of the voltages of the points on the gate line to which the touch gate signal Vtouch_gate is applied to be the same. Here, a different amount of time may be required for at least one point on the gate line, among the points on the gate line to which the touch data signal Vtouch_data is applied, to have the same voltage.

At the point in time (point P1 in FIG. 20C, i.e. point A' in FIG. 21C) in which the signal voltage level of the touch gate signal Vtouch_gate changes from the higher level HIGH to the lower level LOW and the point in time (point P2 in FIG. 20C, i.e. point B' in FIG. 21C), when an amount of time (corresponding to an RC delay) is required for all of the voltages of the points on the gate line to which the touch gate signal Vtouch_gate is applied to be the same, a longer time may be required for the point on the gate line positioned more remotely from the scanning driver 130 than the point positioned closer to the scanning driver 130.

As described above, although there are variations in the RC load (RC delay) depending on the positions of the touch electrodes (common electrodes S11 to S34), the data line and the points thereon, the gate line and the points thereon, as illustrated in FIG. 21B and FIG. 21C, at the point in time (point P1 in FIG. 20A to FIG. 20C, i.e. point A' in FIG. 21C) in which the signal voltage level of each of the touch driving signal Vtouch_vcom, the touch data signal Vtouch_data, and the touch gate signal Vtouch_gate changes from the higher level HIGH to the lower level LOW and the point in time (point P2 in FIG. 20A to FIG. 20C, i.e. point B' in FIG. 21C) in which the signal voltage level thereof changes from the lower level LOW to the higher level HIGH, all of the voltages on the touch electrodes (common electrodes) to which the touch driving signal Vtouch_vcom is applied, the voltages of the points on the data line to which the touch data signal Vtouch_data is applied, and the voltages of the points on the gate line to which the touch gate signal Vtouch_gate is applied become the same as the voltage levels corresponding to the touch reference voltage Vtouch_ref (the higher voltage level HIGH1 and the lower voltage level LOW1).

Therefore, although variations in the RC load (RC delay) are present depending on the positions of the touch electrodes (common electrodes S11 to S34), the data line and the points thereon, and the gate line and the points thereon, the voltages at the individual positions can become the same, thereby preventing parasitic capacitance between the common electrodes and the data lines and between the common electrodes and the gate lines.

Figure 22A:
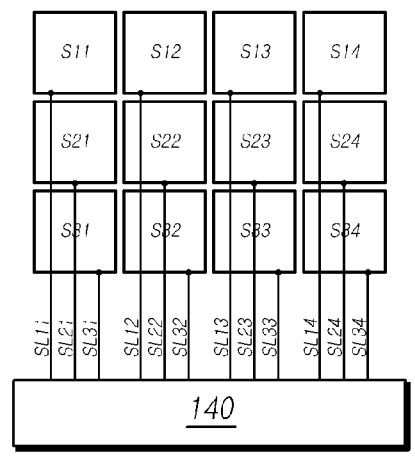
FIG. 22A, FIG. 22B, and FIG. 22C illustrate changes in a voltage at two positions of a common electrode functioning as a touch electrode, depending on two types of touch driving signal Vtouch_vcom applied to the common electrode, in the display device having an in-cell touch structure according to the embodiment.
Figure 22B:
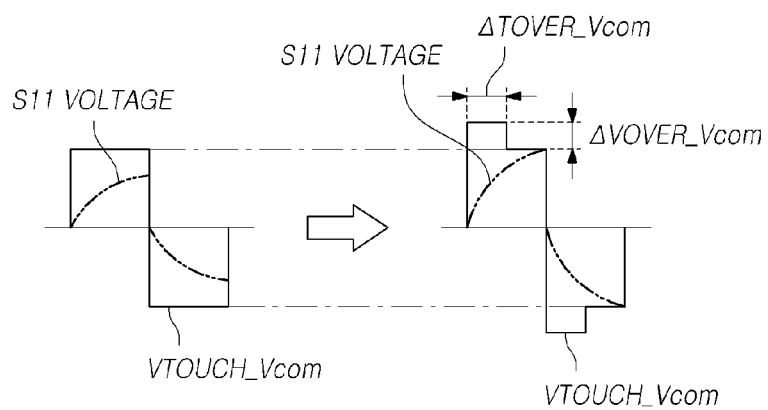
Figure 22C:
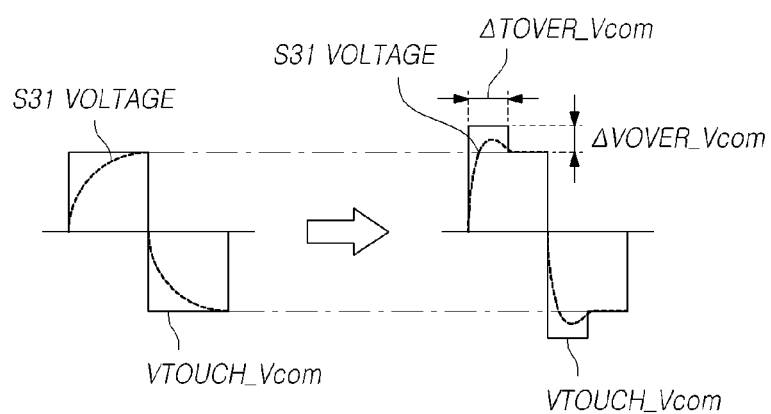

FIG. 22A, FIG. 22B, and FIG. 22C illustrate changes in a voltage at two positions (a best position and a worst position) of a common electrode functioning as a touch electrode, depending on two types of touch driving signal Vtouch_vcom applied to the common electrode, in the display device 100 having an in-cell touch structure according to the embodiment;

Referring to FIG. 22A, in the touch driving mode, the touch circuit 140 applies a touch driving signal Vtouch_vcom to all or portions of the common electrodes S11 to S34 functioning as touch electrodes.

The RC load (RC delay) may vary depending on the positions of the common electrodes to which the touch driving signal Vtouch_vcom is applied.

For example, the electrodes S11, S12, S13, and S14 on the first row are positioned most remotely from the touch circuit 140, having a greatest RC delay. Thus, the electrodes S11, S12, S13, and S14 on the first row are the worst electrodes having the greatest RC delay. On the other hand, the electrodes S31, S32, S33, and S34 on the third row are positioned closest to the touch circuit 140, having a smallest RC delay. Thus, the electrodes S31, S32, S33, and S34 on the third row are the best electrodes having the smallest RC delay.

FIG. 22B illustrates voltage changes (dotted lines) actually formed on the electrode S11 in the case in which a touch driving signal Vtouch_vcom having the signal waveform illustrated in FIG. 17A is applied to the electrode S11, one of the worst electrodes, when a touch electrode overdrive voltage ΔVover_vcom is 0 and in the case in which a touch driving signal Vtouch_vcom having the signal waveform illustrated in FIG. 17A is applied to the electrode S11 when the touch electrode overdrive voltage ΔVover_vcom is not 0.

Referring to the left part of FIG. 22B, the touch driving signal Vtouch_vcom having the signal waveform, wherein the touch electrode overdrive voltage ΔVover_vcom is 0, is applied to the electrode S11. Since the electrode S11 is the worst electrode having the greatest RC delay, the voltage of the electrode S11 fails to reach the voltage of the applied touch driving signal Vtouch_vcom at a point in time in which the signal voltage level of the applied touch driving signal Vtouch_vcom changes.

In contrast, referring to the right part of FIG. 22B, the touch driving signal Vtouch_vcom having the signal waveform, wherein the touch electrode overdrive voltage ΔVover_vcom additionally applied for the period of touch electrode overdrive ΔTover_vcom is not 0, is applied to the electrode S11. At a point in time (point P1) in which the signal voltage level of the applied touch driving signal Vtouch_vcom changes from the higher level HIGH to the lower level LOW, the voltage of the electrode S11 can reach the voltage of the applied touch driving signal Vtouch_vcom.

Referring to the left part of FIG. 22C, the touch driving signal Vtouch_vcom having the signal waveform, wherein the touch electrode overdrive voltage ΔVover_vcom is 0, is applied to the electrode S31. Since the electrode S31 is the best electrode having the smallest RC delay, the voltage of the electrode S31 can reach the voltage of the applied touch driving signal Vtouch_vcom at a point in time in which the signal voltage level of the applied touch driving signal Vtouch_vcom changes.

Referring to the right part of FIG. 22C, the touch driving signal Vtouch_vcom having the waveform, wherein the touch electrode overdrive voltage ΔVover_vcom additionally applied for the period of touch electrode overdrive ΔTover_vcom is not 0, is applied to the electrode S31. At a point in time (point P1) in which the signal voltage level of the applied touch driving signal Vtouch_vcom changes from the higher level HIGH to the lower level LOW, the voltage of the electrode S31 can reach the voltage of the applied touch driving signal Vtouch_vcom at an earlier point in time.

Here, the period of touch electrode overdrive ΔTover_vcom and the touch electrode overdrive voltage ΔVover_vcom are set such that a voltage on the worst electrode as in FIG. 22B can reach an intended level at an intended point in time (a point in time in which the signal voltage level of the touch driving signal Vtouch_vcom changes). The intended level refers to the voltage of the touch driving signal Vtouch_vcom at the intended point in time.

Figure 23A:
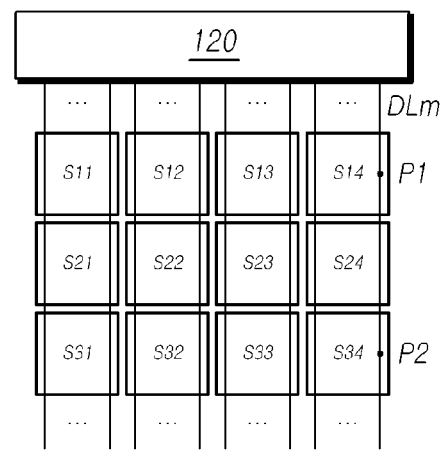
FIG. 23A, FIG. 23B, and FIG. 23C illustrate changes in a voltage at two positions of a data line, depending on two types of touch data signals applied to the data line, in the display device having an in-cell touch structure according to the embodiment.
Figure 23B:
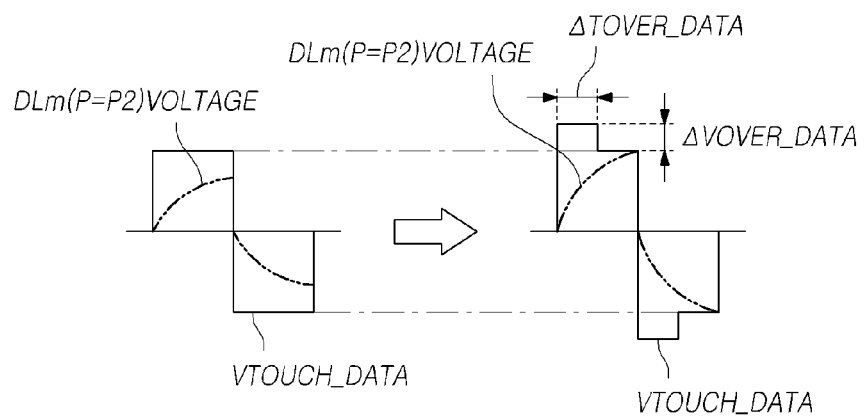
Figure 23C:
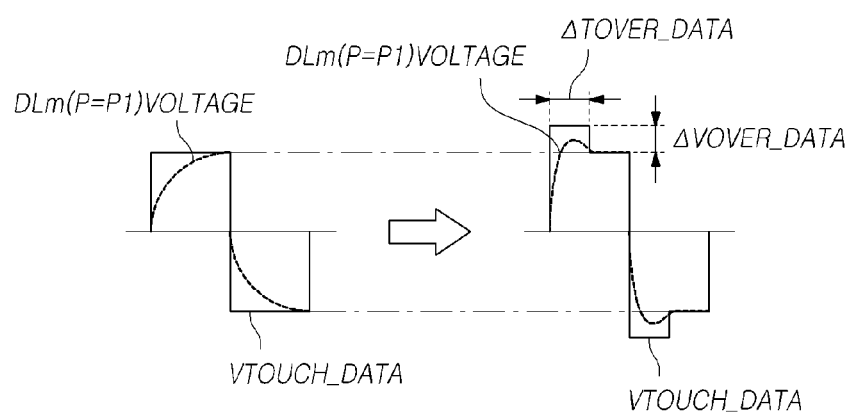

FIG. 23A, FIG. 23B, and FIG. 23C illustrate changes in a voltage at two positions (a best position and a worst position) of a data line, depending on two types of touch data signals applied to the data line, in the display device having an in-cell touch structure according to the embodiment.

Referring to FIG. 23A, in the touch driving mode, the source driver 120 applies a touch data signal Vtouch_data to all or portions of the data lines DL.

The RC load (RC delay) may vary depending on the positions of a plurality of points on the data lines to which the touch data signal Vtouch_data is applied.

For example, point P2 on a data line DLm corresponding to a common electrode on the third row is positioned most remotely from the source driver 120, having a greatest RC delay. Thus, point P2 on the data line DLm is the worst data line point having the greatest RC delay. In addition, point P1 on the data line DLm corresponding to a common electrode on the first row is positioned closest to the source driver 120, having a smallest RC delay. Thus, point P1 on the data line DLm is the best data line point having the smallest RC delay.

FIG. 23B illustrates voltage changes (dotted lines) actually formed at point P2, the worst data line point on the data line DLm, in the case in which a touch data signal Vtouch_data having the signal waveform illustrated in FIG. 17B is applied to the data line DLm when a data line overdrive voltage ΔVover_data is 0 and in the case in which a touch data signal Vtouch_data having the signal waveform illustrated in FIG. 20B is applied to the data line DLm when the data line overdrive voltage ΔVover_data is not 0.

Referring to the left part of FIG. 23C, the touch data signal Vtouch_data having the signal waveform, wherein the data line overdrive voltage ΔVover_data is 0, is applied to the data line DLm. Since point P2 among a plurality of points on the data line DLm is the worst data line point having the greatest RC delay, the voltage of the worst data line point P2 on the data line DLm (DLm (P=P2) voltage) fails to reach the voltage of the applied touch data signal Vtouch_data at a point in time in which the signal voltage level of the applied touch data signal Vtouch_data changes.

In contrast, referring to the right part of FIG. 23B, the touch data signal Vtouch_data having the waveform, wherein the data line overdrive voltage ΔVover_data additionally applied for the period of data line overdrive ΔTover_data is not 0, is applied to the data line DLm. At a point in time (P1 point) in which the signal voltage level of the applied touch data signal Vtouch_data changes from the higher level HIGH to the lower level LOW, the voltage of the worst data line point P2 on the data line DLm (DLm (P=P2) voltage) can reach the voltage of the applied touch data signal Vtouch_data.

Referring to the left part of FIG. 23C, the touch data signal Vtouch_data having the waveform, wherein the data line overdrive voltage ΔVover_data is 0, is applied to the data line DLm. Since point P1 on the data line DLm is the best data line point having the smallest RC delay, the voltage of the best data line point P1 can reach the voltage of the applied touch data signal Vtouch_data at a point in time in which the signal voltage level of the applied touch data signal Vtouch_data changes.

Referring to the right part of FIG. 23C, the touch data signal Vtouch_data having the waveform, wherein the data line overdrive voltage ΔVover_data additionally applied for the period of data line overdrive ΔTover_data is not 0, is applied to the data line DLm. At a point in time (P1 point) in which the signal voltage level of the applied touch data signal Vtouch_data changes from the higher level HIGH to the lower level LOW, the voltage of the best data line point P1 can reach the voltage of the applied touch data signal Vtouch_data at an earlier point in time.

Here, the period of data line overdrive ΔTover_data and the data line overdrive voltage ΔVover_data are set such that a voltage on the worst data line point P2 as in FIG. 23B can reach an intended level at an intended point in time (a point in time in which the signal voltage level of the touch data signal Vtouch_data changes). The intended level refers to the voltage of the touch data signal Vtouch_data at the intended point in time.

Figure 24A:
FIG. 24A, FIG. 24B, and FIG. 24C illustrate changes in a voltage at two positions of a gate line, depending on two types of touch gate signals applied to the gate line, in the display device having an in-cell touch structure according to the embodiment.
Figure 24B:
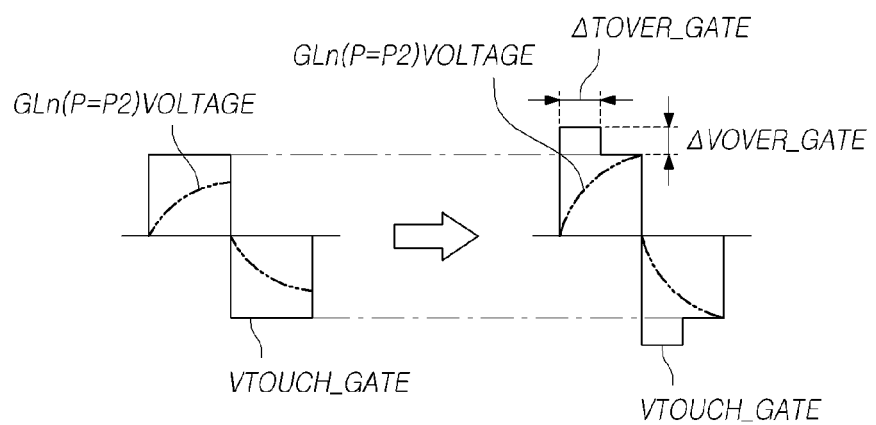
Figure 24C:
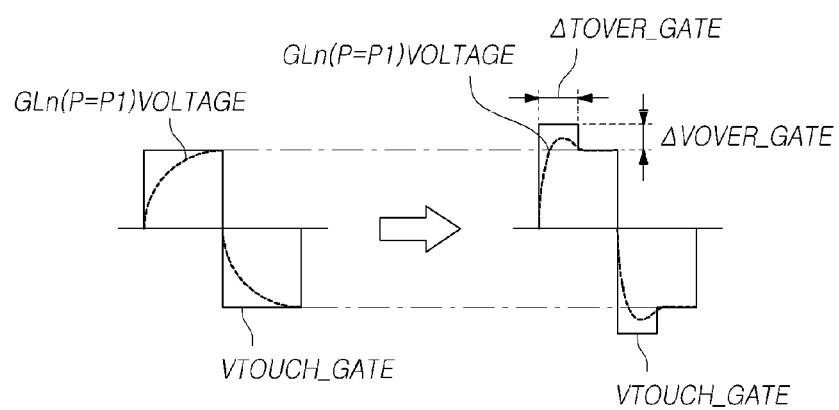

FIG. 24A, FIG. 24B, and FIG. 24C illustrate changes in a voltage at two positions (a best position and a worst position) of a gate line, depending on two types of touch gate signals applied to the gate line, in the display device 100 having an in-cell touch structure according to the embodiment.

Referring to FIG. 24A, in the touch driving mode, the scanning driver 130 applies a touch gate signal Vtouch_gate to all or portions of the gate lines GL.

The RC load (RC delay) may vary depending on the positions of a plurality of points on the gate lines GL to which the touch data signal Vtouch_data is applied.

For example, point P2 on a gate line GLn corresponding to a common electrode on the fourth column is positioned most remotely from the scanning driver 130, having a greatest RC delay. Thus, point P2 on the gate line GLn is the worst gate line point having the greatest RC delay. In addition, point P1 on the gate line GLn corresponding to a common electrode on the first column is positioned closest to the scanning driver 130, having a smallest RC delay. Thus, point P1 on the gate line GLn is the best data line point having the smallest RC delay.

FIG. 24B illustrates voltage changes (dotted lines) actually formed at point P2, the worst gate line point on the gate line GLn, in the case in which a touch gate signal Vtouch_gate having the signal waveform illustrated in FIG. 17C is applied to the gate line GLn when a gate line overdrive voltage ΔVover_gate is 0 and in the case in which a touch gate signal Vtouch_gate having the signal waveform illustrated in FIG. 20C is applied to the gate line GLn when the gate line overdrive voltage ΔVover_gate is not 0.

Referring to the left part of FIG. 24B, the touch gate signal Vtouch_gate having the waveform, wherein the gate line overdrive voltage ΔVover_gate is not 0, is applied to the gate line GLn. Since point P2 among a plurality of points on the gate line GLn is the worst gate line point having the greatest RC delay, at a point in which in which the signal voltage level of the applied touch gate signal Vtouch_gate changes, the voltage of the worst gate line point P2 on the gate line GLn (DLm (P=P2) voltage) fails to reach the voltage of the applied touch gate signal Vtouch_gate.

In contrast, referring to the right part of FIG. 24B, the touch gate signal Vtouch_gate having the waveform, wherein the gate line overdrive voltage ΔVover_gate additionally applied for the period of gate line overdrive ΔTover_gate is not 0, is applied to the gate line GLn. At a point in time (P1 point) in which the signal voltage level of the applied touch gate signal Vtouch_gate changes from the higher level HIGH to the lower level LOW, the voltage of the worst gate line point P2 on the gate line GLn (GLn (P=P2) voltage) can reach the voltage of the applied touch gate signal Vtouch_gate.

Referring to the left part of FIG. 24C, the touch gate signal Vtouch_gate having the waveform, wherein the gate line overdrive voltage ΔVover_gate is 0, is applied to the gate line GLn. Since point P1 on the gate line GLn is the best gate line point having the smallest RC delay, at a point in time in which the signal voltage level of the applied touch gate signal Vtouch_gate changes, the voltage of the best gate line point P1 can reach the voltage of the applied touch gate signal Vtouch_gate.

Referring to the right part of FIG. 24C, the touch gate signal Vtouch_gate having the waveform, wherein the gate line overdrive voltage ΔVover_gate additionally applied for the period of gate line overdrive ΔTover_gate is not 0, is applied to the gate line GLn. At a point in time (P1 point) in which the signal voltage level of the applied touch gate signal Vtouch_gate changes from the higher level HIGH to the lower level LOW, the voltage of the best gate line point P1 can reach the voltage of the applied touch gate signal Vtouch_gate at an earlier point in time. Here, the period of gate line overdrive ΔTover_gate and the gate line overdrive voltage ΔVover_gate are set such that a voltage on the worst gate line point P2 as in FIG. 24B can reach an intended level at an intended point in time (a point in time in which the signal voltage level of the touch gate signal Vtouch_gate changes). The intended level refers to the voltage of the touch gate signal Vtouch_gate at the intended point in time.

Figure 25:
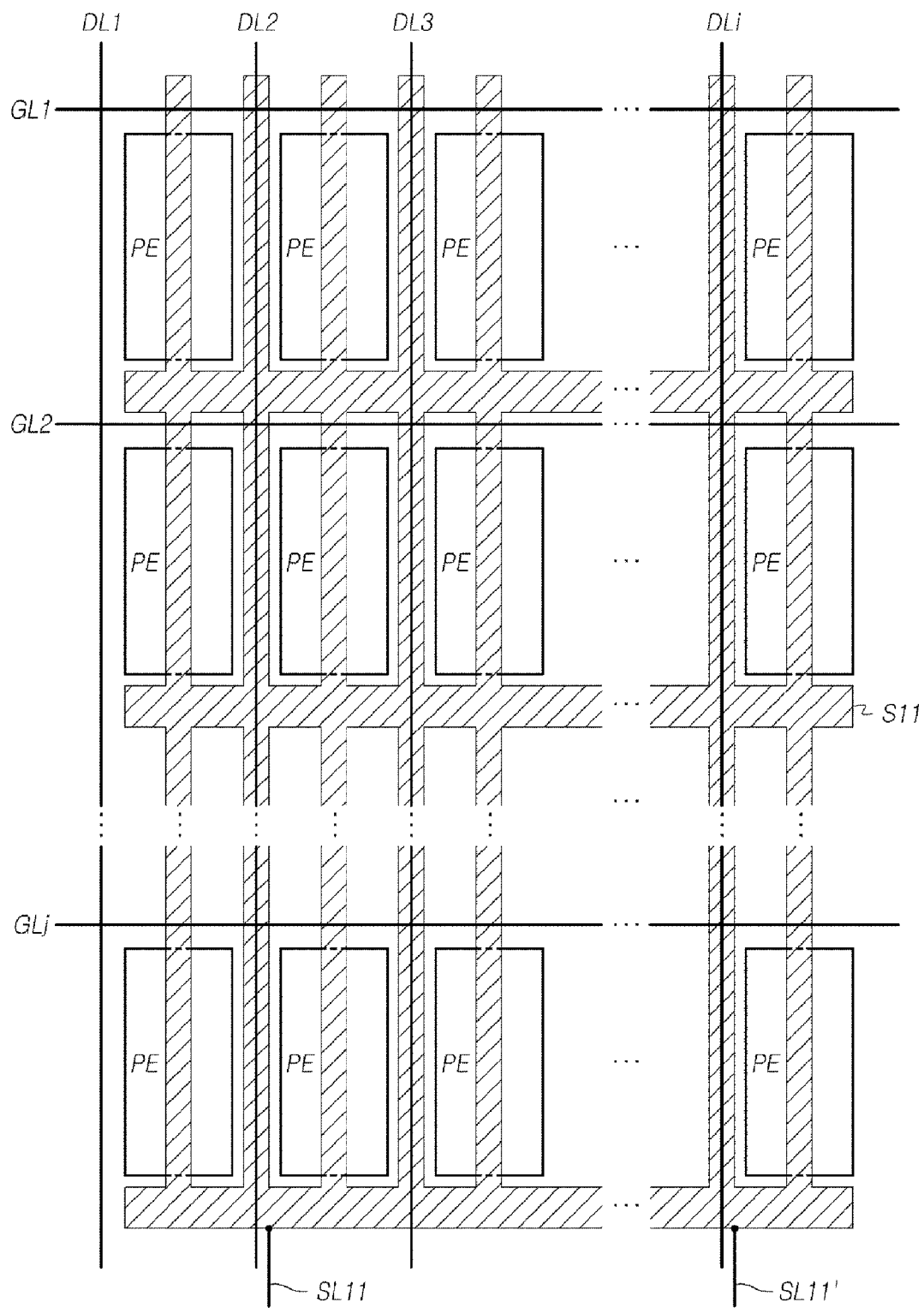
FIG. 25 is a top-plan view illustrating a unit touch electrode area in the display device having an in-cell touch structure according to the embodiment when each of the plurality of electrodes functioning as touch electrodes is formed as a pattern including a finger-shaped portion.

FIG. 25 is a top-plan view illustrating a unit touch electrode area in which the electrode S11 is formed in the display device 100 having an in-cell touch structure according to the embodiment when each of the plurality of electrodes S11 to S14, S21 to S24, and S31 to S34 functioning as touch electrodes is formed as a pattern including a finger-shaped portion.

Although each of the plurality of electrodes S11 to S14, S21 to S24, and S31 to S34 able to function as both common electrodes and touch electrodes may be formed as a block-shaped pattern as illustrated in FIG. 1 to FIG. 22C, each of the plurality of electrodes may be formed as a finger-shaped pattern for the purpose of a higher aperture ratio, a wider viewing angle, and the like, like the electrode S11 illustrated in FIG. 25.

In addition, one or more signal lines can be connected to the electrode S11 functioning as both a common electrode and a touch electrode, such that a common voltage Vcom or a touch driving signal Vtouch_vcom is transferred through the signal lines.

In the exemplary configuration illustrated in FIG. 25, two signal lines SL11 and SL11' are connected to the electrode S11 functioning as both a common electrode and a touch electrode in order to reduce a resistance.

Figure 26:
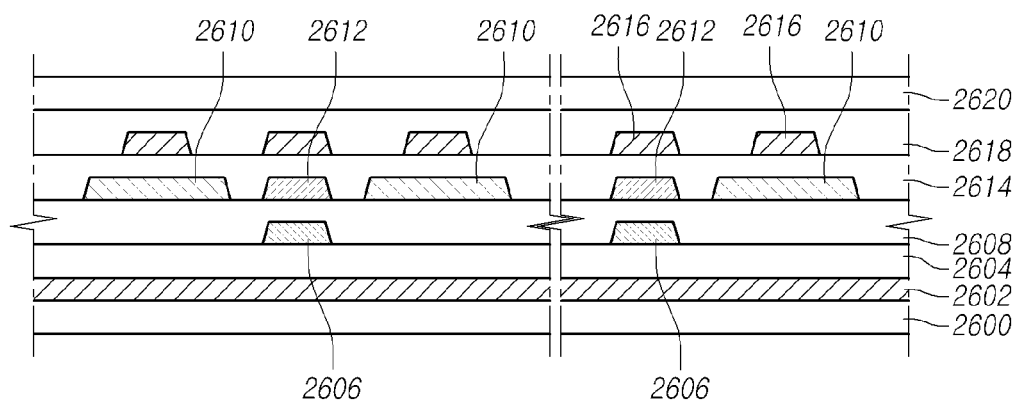
FIG. 26 is a cross-sectional view illustrating the unit touch electrode area in the display device having an in-cell touch structure according to the embodiment when each of the plurality of electrodes functioning as touch electrodes is formed as the pattern including the finger-shaped portion.

FIG. 26 is a cross-sectional view illustrating the unit touch electrode area in the display device 100 having an in-cell touch structure according to the embodiment when each of the plurality of electrodes S11 to S14, S21 to S24, and S31 to S34 functioning as touch electrodes is formed as the pattern including the finger-shaped portion.

Referring to FIG. 26, in the panel 110 of the display device 100 having an in-cell touch structure according to the embodiment, for example, gate lines 2602 are disposed on a lower substrate 2600 in a second direction (in a row direction, the right and left direction in FIG. 26), and a gate insulating layer 2604 is disposed thereon.

Data lines 2606 are disposed on the gate insulating layer 2604 in a first direction (a column direction perpendicular to the paper surface in FIG. 26), and a first passivation layer 2608 is disposed thereon.

Pixel electrodes 2610 and signal lines 2612 of each pixel area are disposed on the first passivation layer 2608, and a second passivation layer 2614 is disposed thereon. The signal lines 2612 are connected from the plurality of electrodes S11 to S14, S21 to S24, and S31 to S34 functioning as both the common electrodes and the touch electrodes to the touch circuit 140 such that a touch driving signal Vtouch_vcom is transferred through the signal lines 2612 in the touch driving mode.

A single electrode 2616 functioning as both a common electrode and a touch electrode is disposed on the second passivation layer 2614, and a liquid crystal layer 2618 is disposed thereon. The electrode 2616 functioning as both a common electrode and a touch electrode is one of the plurality of electrodes S11 to S14, S21 to S24, and S31 to S34, and has a plurality of finger-shaped portions, as illustrated in FIG. 26.

An upper substrate 2620 on which a black matrix, a color filter, and the like are formed is positioned on the liquid crystal layer 2618.

The touch circuit 140 of the display device 100 having an in-cell touch structure according to the embodiment is disposed outside the source driver 120 and the scanning driver 130, as illustrated in the above-mentioned figures. Alternatively, as illustrated in FIG. 27A and FIG. 27B, the touch circuit 140 may be disposed within the source driver 120 or the scanning driver 130.

Figure 27A:
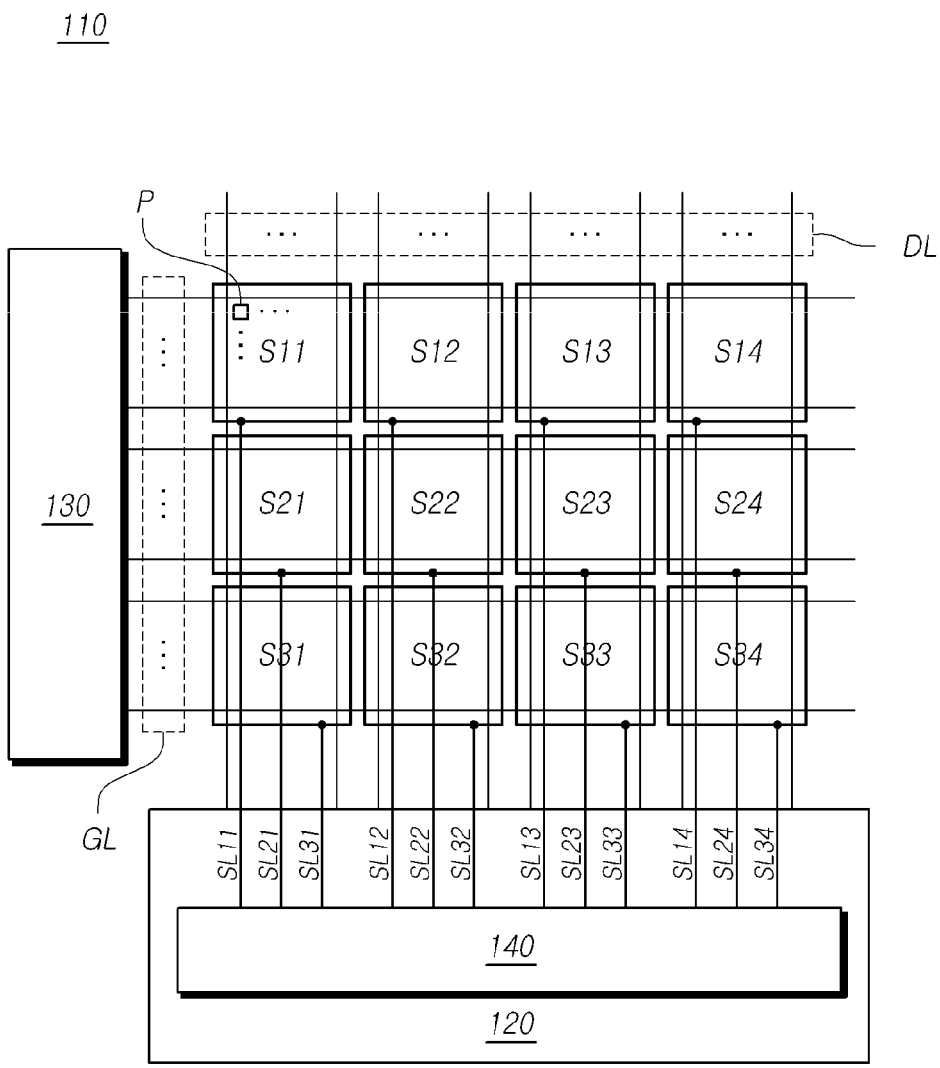
FIG. 27A and FIG. 27B are configuration views illustrating other exemplary panels of the display device having an in-cell touch structure according to the embodiment.
Figure 27B:
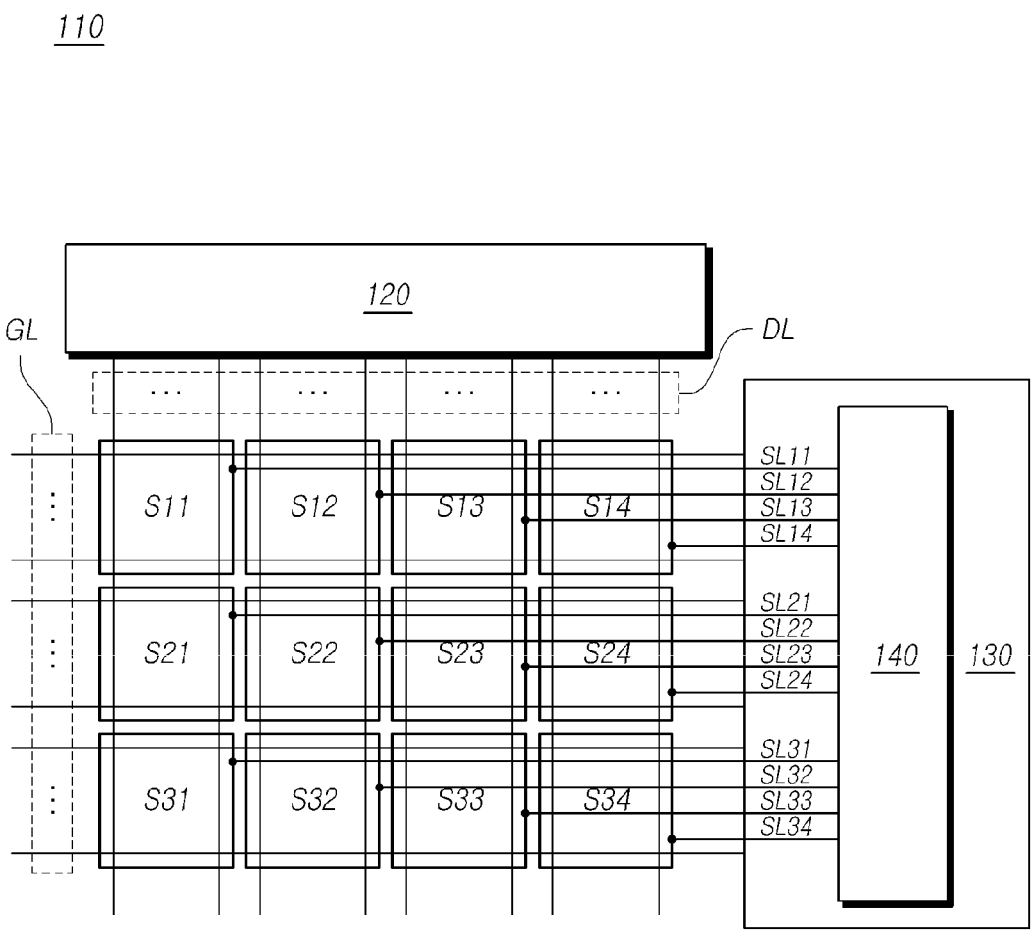

FIG. 27A and FIG. 27B are configuration views illustrating other exemplary panels of the display device 100 having an in-cell touch structure according to the embodiment.

FIG. 27A illustrates the display device 100 having an in-cell touch structure in which the touch circuit 140 is included in the source driver 120, while FIG. 27B illustrates the display device 100 having an in-cell touch structure in which the touch circuit 140 is included in the scanning driver 130.

In the display device of FIG. 27A, in the touch driving mode, a touch driving signal Vtouch_vcom to be applied to the common electrodes functioning as touch electrodes and a touch data signal Vtouch_data to be applied to the data lines are finally output from the source driver 120.

In the display device of FIG. 27B, in the touch driving mode, a touch driving signal Vtouch_vcom to be applied to the common electrodes functioning as touch electrodes and a touch gate signal Vtouch_gate to be applied to the gate lines are finally output from the scanning driver 130.

Hereinafter, the method of driving the display device 100 having an in-cell touch structure according to the embodiment as described above will be now described in brief with reference to FIG. 28.

Figure 28:
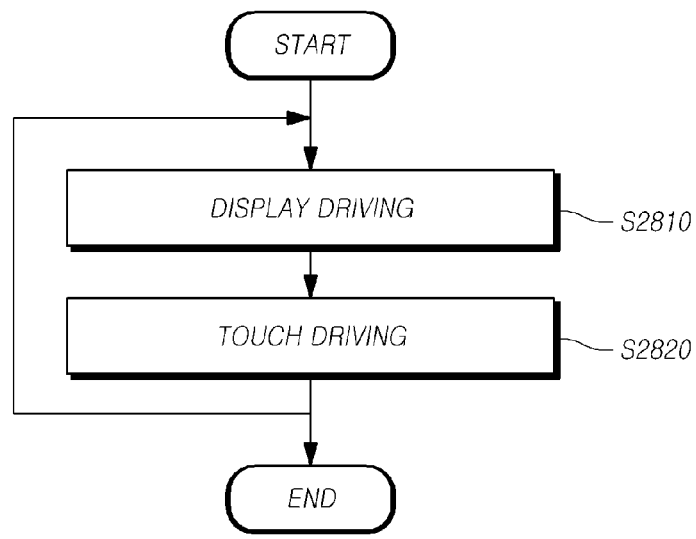
FIG. 28 is a flowchart illustrating a method of driving display device having an in-cell touch structure according to the embodiment.

FIG. 28 is a flowchart illustrating a method of driving the display device 100 having an in-cell touch structure according to the embodiment.

Referring to FIG. 28, the method of driving the display device 100 having an in-cell touch structure includes a display driving operation S2810 and a touch driving operation S2820. The display device 100 includes the panel 110 and the touch circuit 140, wherein the plurality of data lines DL and the plurality of gate lines GL are disposed on the panel 110, defining the plurality of pixels P, and the plurality of common electrodes S11 to S34 are disposed on the panel 110. The display driving operation S2810 is enabled in the timing of display driving, and includes supplying data voltages Vdata to the plurality of data lines DL, sequentially supplying a scanning signal SCAN to the plurality of gate lines GL, and applying a common voltage Vcom to the plurality of common electrodes. The touch driving operation S2820 is enabled in the timing of touch driving, and includes applying a touch driving signal Vtouch_vcom to at least one common electrode among the plurality of common electrodes, and further applying a touch data signal Vtouch_data to at least one data line among the plurality of data lines DL or further applying a touch gate signal Vtouch_gate to at least one gate line among the plurality of gate lines GL.

Referring to FIG. 28, the display driving operation S2810 and the touch driving operation S2820 can be repeatedly carried out.

At the touch driving operation S2820, the touch driving signal Vtouch_vcom is applied to at least one common electrode among the plurality of common electrodes for a set period of time ΔTover_vcom. Referring to the waveform of the touch driving signal Vtouch_vcom, the signal strength thereof may be greater than that of a reference voltage Vtouch_ref by a predetermined voltage 2×ΔVover_vcom.

In addition, at the touch driving operation S2820, when the touch data signal Vtouch_data is further applied to at least one data line among the plurality of data lines for a set period of time ΔTover_data, the waveform thereof may be configured such that the signal strength is greater than that of the reference voltage Vtouch_ref by a predetermined voltage 2×ΔVover_data.

In addition, at the touch driving operation S2820, when the touch gate signal Vtouch_gate is further applied to at least one gate line among the plurality of gate lines, the waveform thereof may be configured such that the signal strength is greater than that of the reference voltage Vtouch_ref by a predetermined voltage 2×ΔVover_gate.

As set forth above, according to the present invention, it is possible to provide a display device having an in-cell touch structure and a method of driving the same able to prevent parasitic capacitance that would otherwise increase the load of a touch operation, lower the accuracy of touch sensing, or disable touch sensing.

In addition, according to the present invention, it is possible to provide a medium-sized or larger display device having an in-cell touch structure that could have not been previously realized due to parasitic capacitance.

Furthermore, according to the present invention, it is possible to provide a display device having an in-cell touch structure able to prevent parasitic capacitance regardless of variations in the RC load due to different panel positions.

In addition, according to the present invention, it is possible to provide a display device having an in-cell touch structure able to increase the efficiency of touch sensing by forming a voltage having an intended level on a touch electrode, a data line, or a gate line within a predetermined period of time when applying a touch driving signal, a touch data signal, or a touch gate signal to the touch electrode, the data line, or the gate line in consideration of variations in the RC load.

The display device having an in-cell touch structure according to the embodiment may be implemented as a liquid crystal display (LCD) device, a plasma display device, an organic light-emitting diode (OLED) display device, or the like.

The foregoing descriptions and the accompanying drawings have been presented in order to explain the certain principles of the present invention. A person skilled in the art to which the invention relates can make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended claims and all of their equivalents fall within the scope of the invention.

What is claimed is:

1. A display driver circuit for driving a display device, the display driver circuit comprising:
    first circuitry to generate a touch drive signal; and
    second circuitry to provide the touch drive signal to touch sense electrodes of the display device and a touch data signal to data lines of the display device during a touch period and to provide display data signals to the data lines of the display device during a display period,
    wherein a touch gate signal is provided to gate lines of the display device during the touch period, and
    wherein the touch drive signal, the touch data signal, and the touch gate signal are driven in phase with each other and amplitudes of (a) the touch drive signal and (b) one or more of the touch data signal and the touch gate signal are overdriven by their respective overdrive amplitude with respect to a reference waveform during their respective overdrive duration.

2. The display driver circuit of claim 1, wherein one or more of the overdrive amplitudes or the overdrive durations of the touch data signal or the touch gate signal is different from the overdrive amplitude or overdrive duration of the touch drive signal.

3. The display driver circuit of claim 1, wherein:
    the reference waveform is a pulse waveform periodically alternating between a high level and a low level, and
    one or more of the touch driving signal, the touch data signal, and the touch gate signal have two or more different high voltage levels during the high level and two or more different low voltage levels during the low level.

4. The display driver circuit of claim 1, wherein the overdrive amplitude or the overdrive duration is greater as distance from the second circuitry to the touch sense electrodes, the data lines, or the gate lines is farther.

5. The display driver circuit of claim 1, wherein the overdrive durations begin when the touch drive signal, the touch data signal, or the touch gate signal transitions from low level to high level, or vice versa.

6. The display driver circuit of claim 1, wherein amplitudes of two or more of the touch drive signal, the touch data signal, and the touch gate signal are same at transition from low level to high level, or vice versa, said transition occurring subsequent to end of the overdrive duration, regardless of position in the data lines or the gate lines or of the touch sense electrodes.

7. A method for driving a display device, the method comprising:
    generating a touch drive signal; and
    providing the touch drive signal to touch sense electrodes of the display device and a touch data signal to data lines of the display device during a touch period and to provide display data signals to the data lines of the display device during a display period,
    wherein a touch gate signal is provided to gate lines of the display device during the touch period, and
    wherein the touch drive signal, the touch data signal, and the touch gate signal are driven in phase with each other and amplitudes of (a) the touch drive signal and (b) one or more of the touch data signal and the touch gate signal are overdriven by their respective overdrive amplitude with respect to a reference waveform during their respective overdrive duration.

8. The method of claim 7, wherein one or more of the overdrive amplitudes or the overdrive durations of the touch data signal or the touch gate signal is different from the overdrive amplitude or overdrive duration of the touch drive signal.

9. The method of claim 7, wherein:
the reference waveform is a pulse waveform periodically alternating between a high level and a low level, and
one or more of the touch driving signal, the touch data signal, and the touch gate signal have two or more different high voltage levels during the high level and two or more different low voltage levels during the low level.

10. The method of claim 7, wherein the overdrive amplitude or the overdrive duration is greater as distance from the second circuitry to the touch sense electrodes, the data lines, or the gate lines is farther.

11. The method of claim 7, wherein the overdrive durations begin when the touch drive signal, the touch data signal, or the touch gate signal transitions from low level to high level, or vice versa.

12. The method of claim 7, wherein amplitudes of two or more of the touch drive signal, the touch data signal, and the touch gate signal are same at transition from low level to high level, or vice versa, said transition occurring subsequent to end of the overdrive duration, regardless of position in the data lines or the gate lines or of the touch sense electrodes.

13. A display device comprising:
a panel including a plurality of data lines, a plurality of gate lines, and a plurality of electrodes grouped into a plurality of electrode groups, pixels of the display device being defined at intersections of the gate lines and the data lines;
a touch driver to provide a touch drive signal to the electrodes of the display device during a touch period;
a data driver to provide display data signals to the data lines of the display device during a display period and a touch data signal to the data lines of the display device during the touch period; and
a gate driver sequentially supplying a scanning signal to the gate lines during the display period and to provide a touch gate signal to the gate lines during the touch period,
wherein the touch drive signal, the touch data signal, and the touch gate signal are driven in phase with each other and amplitudes of (a) the touch drive signal and (b) one or more of the touch data signal and the touch gate signal are overdriven by their respective overdrive amplitude with respect to a reference waveform during their respective overdrive duration.

14. The display device of claim 13, wherein one or more of the overdrive amplitudes or the overdrive durations of the touch data signal or the touch gate signal is different from the overdrive amplitude or overdrive duration of the touch drive signal.

15. The display device of claim 13, wherein:
the reference waveform is a pulse waveform periodically alternating between a high level and a low level, and
one or more of the touch driving signal, the touch data signal, and the touch gate signal have two or more different high voltage levels during the high level and two or more different low voltage levels during the low level.

16. The display device of claim 13, wherein the overdrive amplitude or the overdrive duration is greater as distance from the second circuitry to the touch sense electrodes, the data lines, or the gate lines is farther.

17. The display device of claim 13, wherein the overdrive durations begin when the touch drive signal, the touch data signal, or the touch gate signal transitions from low level to high level, or vice versa.

18. The display device of claim 13, wherein amplitudes of two or more of the touch drive signal, the touch data signal, and the touch gate signal are same at transition from low level to high level, or vice versa, said transition occurring subsequent to end of the overdrive duration, regardless of position in the data lines or the gate lines or of the touch sense electrodes.

* * * * *